United States Patent [19]

Bannon et al.

[11] Patent Number: 5,437,027
[45] Date of Patent: * Jul. 25, 1995

[54] SYSTEM AND METHOD FOR DATABASE MANAGEMENT SUPPORTING OBJECT-ORIENTED PROGRAMMING

[75] Inventors: Thomas J. Bannon, Dallas; Stephen J. Ford; Vappala J. Joseph, both of Plano; Edward R. Perez, Dallas; Robert W. Peterson; Diana M. Sparacin, both of Plano; Satish M. Thatte, Richardson; Carig W. Thompson, Plano; Chung C. Wang; David L. Wells, both of Dallas, all of Tex.

[73] Assignee: Texas Instruments Incorporated, Dallas, Tex.

[*] Notice: The portion of the term of this patent subsequent to Mar. 22, 2011 has been disclaimed.

[21] Appl. No.: 110,040

[22] Filed: Aug. 20, 1993

Related U.S. Application Data

[62] Division of Ser. No. 531,493, May 30, 1990, Pat. No. 5,297,279.

[51] Int. Cl.⁶ .............................................. G06F 17/30
[52] U.S. Cl. ..................................... 395/600; 395/700; 364/DIG. 1; 364/282.1; 364/283.1; 364/283.4
[58] Field of Search ............... 395/425, 600, 500, 650, 395/700, 725

[56] References Cited

U.S. PATENT DOCUMENTS

| | | | |
|---|---|---|---|
| 4,525,780 | 6/1985 | Bratt et al. | 395/650 |
| 4,853,842 | 8/1989 | Thatte et al. | 395/425 |
| 4,989,132 | 1/1991 | Mellender et al. | 395/425 |
| 5,075,842 | 12/1991 | Lai | 395/425 |
| 5,075,845 | 12/1991 | Lai et al. | 395/425 |
| 5,075,848 | 12/1991 | Lai et al. | 395/425 |
| 5,079,695 | 1/1992 | Dysart et al. | 395/700 |
| 5,297,279 | 3/1994 | Bannon et al. | 395/600 |

OTHER PUBLICATIONS

Maier, D. et al, "Development of an Object Oriented DBMS", Object Oriented Programming; Systems, Languages & Applications (OOPSLA), 1986, p. 472+.
Peter Lyngbaek, et al. "A Data Modeling Methodology for the Design and Implementation of Informaiton Systems", Int'L Workshop on Object-Oriented Databases Systems, 1986, p. 6+.
Kevin Wilkinson, et al. "The IRIS Architecture and Implementation", IEEE Trans. on knowledge and Data Engineering, V2N1 Mar. 1990, p. 63+.
Timothy Andrews, et al, "Combining Language and Database Advances in an Object-Oriented Development Environment", Object-Oriented Programming: Systems, Languages and Applications (OOPSLA) 1987, p. 430+.
Won Kim, et al. "Integrating an Object-Oriented Programming System with a Database System", Object Oriented Programming: Systems, Languages and Applications (OOPSLA) 1988, p. 142+.

(List continued on next page.)

*Primary Examiner*—Thomas G. Black
*Assistant Examiner*—John C. Loomis
*Attorney, Agent, or Firm*—Ruben C. DeLeon; James C. Kesterson; Richard L. Donaldson

[57] ABSTRACT

A system and method for database management for providing support for long-term storage and retrieval of objects created by application programs written at least in part in object-oriented programming languages consists of a plurality of software modules. These modules provide data definition language translation, object management, object translation, and persistent object storage service. Such system implements an object fault capability to reduce the number of interactions between the application, the database management system, and the database.

21 Claims, 5 Drawing Sheets

OTHER PUBLICATIONS

Won Kim, et al. "Architecture of the ORION Next-Generation Database Syhstem", IEEE Trans. on knowledge and Data Engineering, V2N1 Mar. 1990, p. 109+.

Michael Stonebraker, "Object Management in POSTGRES Using Procedures", Int'l Workshop on Object-Oriented Database (OOD8) Systems 1986, p. 66+.

Michael Stonebraker, et al. "The Implementation of POSTGRES", IEEE Trans. on knowledge and Data Engineering, V2N1, Mar. 1990, p. 125+.

Puknraj Kachhwaha, et al. "An Object-Oriented Data Model for the Research Laboratory", Int'l Workshop on Object-Oriented Database (OOD8) Systems 1986, p. 218.

Puknraj Kachhwaha, "LCE: An Object-Oriented Database Application Developemtn Tool", SIGMOD Int'l Conference on Management of Data 1988, p. 207.

Laura M. Haas, et al. "Starburst Mid-Flight: As the Dust Clears", IEEE Trans. on knowledge and Data Engineering, V2N1 Mar. 1990, [IBM's Starburst] p. 143+.

Ted Kaehler, "Virtual Memory on a Narrow Machine for an Object-Oriented Language", Object-Oriented Programming: Systems, Languages and Applications (OOPSLA) 1986. [Xerox PARC's LOOM] p. 87+.

Karen E. Smith, et al. "Intermedia: A Case Study of the Difference Between Relational and Object-Oriented Database Systems", Object-Oriented Programming: Systems, Languages and Applications (OOPSLA) 1987. [Brown's Intermedia System] p. 452+.

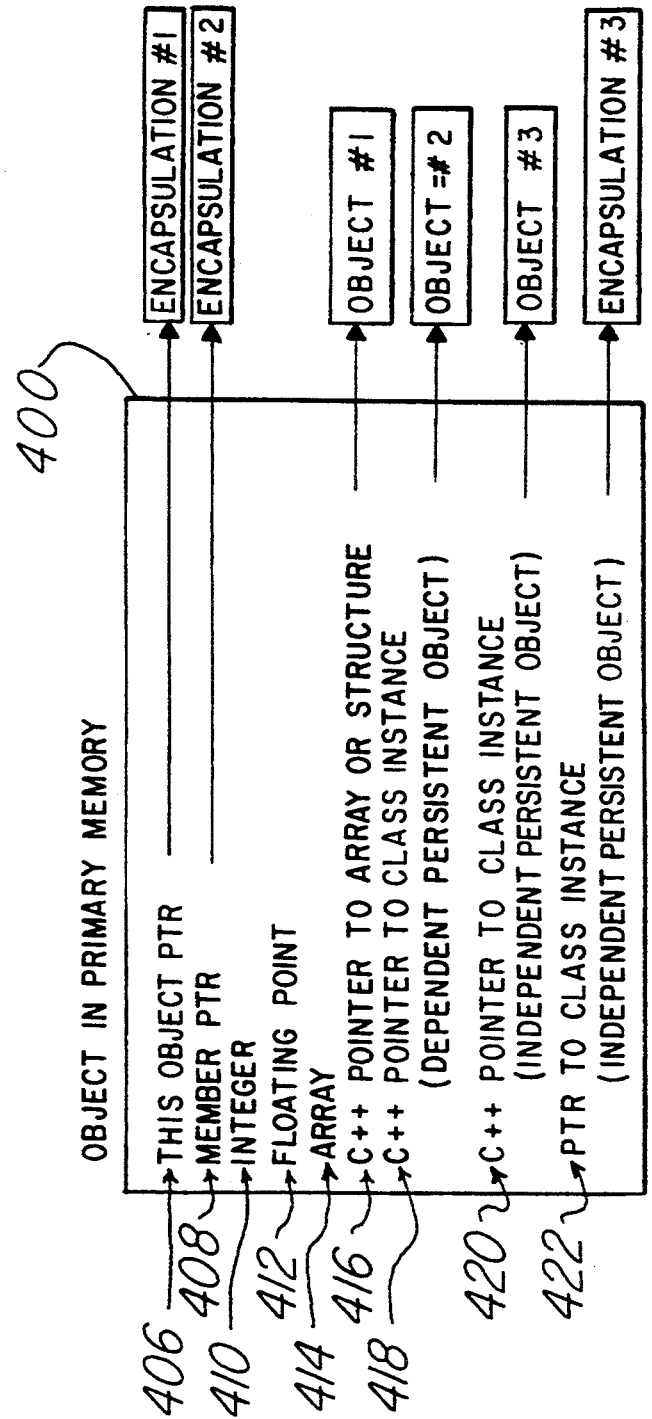

SYSTEM AND METHOD FOR DATABASE MANAGEMENT SUPPORTING OBJECT-ORIENTED PROGRAMMING

NOTICE

©1990 Texas Instruments Incorporated. A portion of the disclosure of this patent document contains material which is subject to copyright protection. The copyright owner has no objection to the facsimile reproduction by anyone of the patent disclosure, as it appears in the Patents and Trademark Office patent file or record, but otherwise reserves all copyright rights whatsoever.

This is a Divisional of application Ser. No. 07/531,493, filed May 30, 1990, now U.S. Pat. No. 5,297,279.

BACKGROUND OF THE INVENTION

1. Field of the Invention

This invention relates to database management systems and more particularly to a system and method providing support for long-term storage and retrieval of objects created by application programs written in object-oriented programming languages.

2. Description of Related Art

Many new computer software applications, such as Computer-Aided Design and Manufacturing, Computer-Aided Software Engineering, multimedia and hypermedia information systems, and Artificial Intelligence Expert systems, have data models that are much more complex than previous systems, both in content and inter-object relationships. Object-oriented languages provide the application developer the mechanism to create and manipulate the data models inherent in these applications. Database systems provide long term storage of the data created by these applications. However, existing languages and databases are insufficient to develop these applications because existing object-oriented languages do not provide direct support for long-term storage and sharing of objects, existing commercial database systems (hierarchical, network, and relational) do not support the necessary complex object-oriented data models, and existing database systems require an application developer to use different languages and modeling paradigms when building applications.

There have been various research and commercial efforts aimed at developing OODBs. These OODBs vary in type of data model employed, application program interaction, object access method, method of persistent object store, etc. Examples of these current OODBs, and their weaknesses, will now be considered.

Iris (Hewlett Packard) and GemStone (Servio Corporation) are representative OODBs employing new proprietary object-oriented data models, while Vbase (Ontologic), Orion (Microelectronics and Computer Technology Corporation), and DOME (Dome Software Corporation) are examples of OODBs incorporating proprietary extensions to existing programming language data models. In these types of OODBs, application developers are required to learn a new proprietary data model in order to effectively use the OODB. Since their data model is new, using it often results in a loss of productivity as application developers learn the new language. In Orion, instances of user-defined classes cannot be stored in the database unless they have been derived from Orion-defined classes. In addition, GemStone and Orion do not allow for an instance of their classes to be transient; that is, every object created in a GemStone- or Orion-based application will be stored in the database unless it is specifically deleted. Another problem with developing a new data model is that it requires application developers to rely on a single source of application development tools, such as language compilers, object libraries, and program debuggers, which limits widespread acceptance of these OODBs.

POSTGRES (University of Berkeley) is an example of an OODB employing another type of data model, that of a proprietary extension to an existing relational database. POSTGRES is a combination of an extended relational and object-oriented database. Objects are created using relational table descriptions, while functions to manipulate the objects are created using the POSTQUEL query language as well as conventional languages (C and LISP). In addition, if the application developer wishes to add indices over user-defined types, they must write and register with POSTGRES functions to perform the various comparison operations between two objects of the same user defined type. Since the latter mode of creating functions requires the application developers to map between the POSTGRES and C/LISP data models, which can be error prone and distracting from the task of developing the application system, this strategy does nothing to alleviate the burdensome requirement to use different languages and modeling paradigms when building applications. This problem of mapping between the object-oriented and relational data models was discussed in-depth in the Intermedia OOPSLA '87 conference paper.

Ontos(Ontologic) and Object Store(Object Design) are representative of OODBs employing the last type of data model, namely the use of an existing programming language data model (e.g., using the C++ programming language data model for writing software programs and interacting with the database). Both systems, however, require the use of a proprietary language compiler to add additional code (Ontos) or translate new and non-standard C++ language constructs (Object Store). As with the first two types of OODBs, this approach requires application developers to rely on a single source of application development tools, which also limits widespread acceptance of these OODBs.

In addition to problems inherent with the type of data models selected, difficulties occur when an application program interacts with an OODB. In the Iris OODB, application developers define object types and develop functions to manipulate the objects using the proprietary Iris language. Iris provides an interactive interface where requests can be made to retrieve or manipulate Iris objects. The requests are evaluated by performing relational queries (since the objects are stored in relational tables) and the result is returned as an Iris expression, not as object values or references. Iris provides an embedded object SQL interface, a C language interface (which is not object-oriented), and allows the application developer to register foreign functions written in existing (possibly non-object-oriented) programming languages. These approaches require the application developer to map the Iris objects into data structures accessible by the programming language, reintroducing the problems discussed above.

Similarly, the developers of the GemStone OODB also defined a new language, OPAL, which the application developer uses to define object types and functions to manipulate the objects. GemStone provides an interactive development environment for developing OPAL objects and functions. GemStone also provides a mechanism for existing programming languages (C and Smalltalk) to interact with GemStone. However, unless the applications developer uses only the OPAL language, two data models and languages must be used to interact with the database, mapping the OPAL objects into structures accessible by the programming language, and thereby resulting in the problems associated discussed previously.

The Vbase OODB requires two separate languages, TDL to define object types, and COP (an extension to the C programming language) to develop application programs. Although application developers do not need to map objects between the data model and the programming language, they must still use two languages during the development of their programs, with the attendant problems considered above. A further restriction of this system includes the failure to provide access to the database from other programming languages.

Although the Orion OODB developers used an existing programming language, Common Lisp, for their data model, they developed several proprietary extensions to the language. As with Vbase, there is no need to map between the data model and programming language with the Orion OODB. However, this approach requires the use of a proprietary language translator.

The developers of POSTGRES, on the other hand, expect most application developers to write programs that interact with file database primarily using the POSTGRES query language, POSTQUEL. Navigation between objects is possible; however, a query must be issued to perform the navigation instead of accessing the referenced object directly. Application developers can define and implement their own functions including programming language statements, POSTQUEL query statements, and/or calls to POSTGRES' internal functions. Thus, application developers may have to deal with two or more data models to build their application systems. Such requirement fails to alleviate the problems considered above.

The Ontos approach provides an interface from the C++ language to the database. However, the amount of interaction between the program and Ontos is much higher than is reasonable or necessary due to the requirement of specialized functions that must be provided by the application developer (e.g., object construction, translation, storage/retrieval, etc.). This burdens the application developer with more work that could have been performed by the database system. Object Store also provides an interface from the C++ language to the database. However, the interface is accomplished by redefining the semantics of or adding new C++ language constructs, thereby requiring the use of Object Design's proprietary C++ language translator, which limits widespread acceptance of their system.

Access to an object in an OODB is performed by manipulating the object using predefined functions, using an explicit query, or by coding explicit references in a programming language.

In the Iris OODB, application developers call functions to retrieve or change values in the object. A program cannot receive a reference to an object which could be passed to other functions. In the GemStone, Vbase, and Orion OODBs, individual objects can be accessed and passed to functions to retrieve or assign values.

In the POSTGRES database, application developers perform queries to retrieve or change values in the object (actually, relational tuples). POSTGRES allows a foreign function to access an object, but as stated above, it must be mapped from the relational data model to the data model of the foreign function's programming language.

Although most OODBs allow the application developer to explicitly retrieve an object from the database (Iris and POSTGRES do not), they do not allow the application developer to specify when objects related to the original object should be retrieved. For example, application developers can access objects in Ontos using one of two modes. In the first mode, an object is explicitly retrieved and referenced objects are implicitly retrieved using an object fault capability. In the other mode, one or more related objects can be explicitly retrieved, but the application must continually check to see if a referenced object is already in memory, and then explicitly retrieve it if it is not. This requires the application developer to employ two completely different models of accessing persistent objects in the same program, which can easily cause errors in the program by the inadvertent and natural use of one mode where the other mode should have been used.

The approach taken by Object Store is quite different from the above OODBs with regard to object access. Object Store's model is more like a persistent memory (an extension of virtual memory computer operating system) than an OODB. Object Design chose to completely reimplement the virtual memory management functions of the C++ programming language and the UNIX (TM) operating system. Whenever a persistent object is created or retrieved from the database, it is installed in a portion of primary memory controlled by Object Design. Thus, references to the object are, in essence, monitored by Object Design's software. If the object is not currently in primary memory, it will be retrieved from the database and installed in primary memory. This style of memory management requires that any class or class library requiring persistence must be written using this memory management scheme, or perform no dynamic memory management thereby resulting in one version of the library for persistent usage and one version for transient usage. Although this approach improves the object storage and retrieval performance, it is inherently dependent on the underlying computer operating system and memory architecture, and thus not portable to other computer systems.

Therefore, these approaches either limit how an application program can access an object, or require additional work in order for the program to access an object.

Most OODBs (except for Iris and DOME) have developed their persistent object storage facility utilizing an existing file management system. They had to develop new implementations of the disk storage structures and management, concurrency control, transaction management, communication, and storage management subsystems. This approach increases the complexity of the overall database system software.

The Iris and DOME OODBs, on the other hand, use existing commercial Relational Database Management Systems (RDBMS) to store their objects. Although the Iris OODB uses Hewlett Packard's relational database HP-SQL, it does not use the SQL interface to that database, restricting access to the objects to the available Iris functions, Iris interactive browser, C language interface, and embedded Iris SQL. Although Iris allows the application developer to define how objects are to be stored, the use of Hewlett Packard's RDBMS imposes a limit on the size of an object. The DOME OODB, which uses Oracle Corporation's Oracle RDBMS, and the POSTGRES system, which has its own relational storage system, decomposes objects into one or more entries in one or more relational tables. This approach requires a relational join whenever more than one attribute value from an object is retrieved. Relational join operations are computationally expensive.

In the GemStone and Object Store OODBs, the unit of concurrency control is not an object but a secondary memory segment, or page. This approach can improve the performance of secondary memory reads and writes, but results in having the storage facility read, write, and lock more data than may be necessary. In addition, this restricts the amount of concurrent access to objects since the OODB system, and not the application developer, chooses the unit of concurrency control.

Most of the OODBs allow related objects to be clustered together in the persistent object storage. GemStone and Orion only allow clustering controls to be specified when the entire database is defined. Vbase and Ontos allow runtime specification of clustering controls to store one persistent object as close as possible to another persistent object. Object Store also allows runtime specification of clustering controls to store statically allocated objects in a specific database and dynamically allocated objects in a specific database or as dose as possible to another persistent object. This requires the application developer to treat similar objects with different models of clustering, which can cause errors in the program by the inadvertent use of one mode where the other mode should have been used. These systems indicate that such clustering specifications are purely hints which the system may ignore. These clustering hints may require rebuilding of the database if they are changed, thereby restricting the ability of the application developers to tune the database's performance by altering the physical grouping of objects. Furthermore, the systems based on relational storage, such as Iris, POSTGRES, and DOME, do not allow user-defined clustering of objects.

SUMMARY OF THE INVENTION

In view of the above problems associated with the related art, it is an object of the present invention to provide a database management system and method which supports long term storage and retrieval of objects created by application programs, and which uses existing object-oriented programming languages to thereby enable such system and method to be ported to other computer platforms without requiring any modifications to existing language translators or computer operating systems and thereby not unduly restrict application developers in their choice of computer platform or language translator.

It is a further object of the present invention to provide a database management system and method providing a standard object-oriented programming interface for its database functionality, thereby eliminating any requirement for mixing of object-oriented and functional, or other, programming styles to confuse the application developer when coding a program's interface to that of the present invention.

It is yet another object of the present invention to provide a database management system and method for adding persistence to existing language objects orthogonally, thereby allowing application programmers to treat persistent and nonpersistent objects in nearly the same manner and eliminating the need to use two or more data models when building application systems.

Another object of the present invention is to provide a database management system and method that allows the application developer to specify at object definition time how related objects, whether created dynamically or statically, should be clustered when stored, to thereby provide a capability to adjust the size of storage objects to enhance the overall system performance.

Still another object of the present invention is to provide a database management system and method that reduces the number of interactions with the database management system that an application developer must code to access objects stored in the database.

It is a further object of the present invention to provide a database management system and method that allows the application developer to specify at application execution time prior to saving a persistent object whether or not to install in primary memory the persistent objects referenced from the given persistent object at the same time when the given object is later installed in primary memory, either due to explicit or implicit retrieval, to enhance the overall system performance.

A further object of the present invention is to provide maximization of concurrent usage of the objects in the database by making the unit of locking the individual persistent object instead of a page of persistent objects.

It is still another object of the present invention to store objects in a persistent object storage server utilizing a relational database management system by storing an external representation of the object and external references from the object without decomposing the objects into multiple relational tuples, to enhance the overall system performance.

Yet another object of the present invention is to provide a database management system and method which uses a uniform object translation methodology thereby eliminating the need for application developers to perform this complex computer-and language-dependent task.

In accordance with the above objects of the invention, the preferred embodiment of the present invention consists of four software modules to provide database services to application developers. They are referred to as the Data Definition Language (DDL) translator, the Object Management System (OMS), the Object Translation System (OTS), and the Persistent Object Storage Server (POS Server).

The present invention presents an application interface for programming languages which does not require any extensions to the languages, modifications to existing language translators, or development of proprietary language translators. Furthermore, the present invention implements an object fault capability which reduces the number of interactions that an application must perform with the database management system and database itself. Access of, and navigation between, objects can be performed using existing language operations in a transparent manner.

Furthermore, instead of requiring the application developers to use one data model to interact with the database and another data model to manipulate the objects in a programming language, the present invention uses the data model of existing standard object-oriented languages, such as C++ and CLOS, as the data model for the database. This alleviates problems associated with the art discussed above.

Although the present invention can be implemented in any object-oriented programming language, and should therefore not be limited in any way to any specific language, it has been implemented in both C++ and Common Lisp. In the C++ embodiment, application developers interact solely with the DDL module, in a batch processing mode, and with the OMS module using standard C++ syntax in their application programs. The DDL module accepts object type descriptions on standard C++ programming language statements (with a few additional syntactic constructs) and extracts sufficient information from the descriptions to enable the OTS module to translate objects between their primary and secondary memory representations. This process is required because this type description information is not available in the C++ run-time system. To achieve architecture-independent translation, the DDL translator also accepts information describing a specific computer architecture and software system environment in which the present invention's applications are to be executed. The POS Server uses a standard SQL interface to a commercial relational database.

In the Common Lisp embodiment, application developers interact solely with the OMS module using standard Common Lisp syntax in their application programs. The DDL module is not implemented since the OTS module can extract the necessary information from the CLOS descriptions during program execution as that information is already available in the Common Lisp run-time system. This embodiment uses a raw disk-based implementation of the POS Server developed by the co-inventors.

The OMS module presents an application interface to perform standard database operations: initializing and terminating the present invention, beginning and committing or aborting database transactions (saving modified objects or discarding them, respectively), designating objects as persistent (to be saved to the database), explicitly retrieving objects from the database, designating objects as having been modified, removing objects from memory, defining the default storage group for logical clustering of objects, etc. The OMS module also supports an automatic and implicit retrieval of objects from the database when an application references a previously saved object that is currently not in primary memory. OMS also provides a facility to associate user-defined names with persistent objects to simplify retrieval of objects. These associations are also stored in the present invention's database. This name-object management module has a well-defined interface and can be replaced with a module of the application developer's choice.

As stated above, the present invention allows the application program to retrieve persistent objects from the database and reference the persistent object's data members or functions. The present invention accomplishes this by defining a new data type or class, the ZG_PTR, that functions equivalently to the current language constructs for referencing persistent objects (pointers in C++; symbols and values in Common Lisp). In addition, the present invention allows the application program to implicitly retrieve a persistent object from the database using an object faulting mechanism. When an application program references a persistent object, if the object is already in primary memory, the application program continues with its operations. If the object is not in primary memory, OMS automatically retrieves the object from the POS and calls upon the OTS module to translate and install the object in primary memory. Finally, the application program is allowed to proceed, unaware of this object faulting processing.

The OTS module is responsible for translating objects between their primary and secondary memory representations in a computer architecture-independent manner. When an object is being saved, the OTS module uses the information extracted by the DDL translator to determine the extent, or boundary, of the object and then translates all of the objects within the boundary to a computer architecture independent representation. When an object is retrieved from the POS, OTS creates the appropriate primary memory representation, assigns the object's values from the stored representation, and allocates OMS data structures for every reference contained in the object to other persistent objects.

The POS Server module provides a stable storage facility for the objects made persistent by the application program. Objects are stored in the computer's long term, or secondary, memory. The POS Server also provides to the OMS module concurrency control primitives and atomic transactions (all objects are saved or none are saved). Objects are stored as an untyped array of bytes which only OTS understands.

The present invention stores objects via the POS Server in a computer architecture-independent representation utilizing information about the computer's computational, or primary, memory architecture. Information on the content and structure of the objects is extracted from the object definitions declared in the supported languages. This allows applications written in any of the supported languages to store objects in the same POS. Currently the POS Server is implemented in a modular and portable fashion using an existing commercial Relational Database Management System (RDBMS). The POS Server interacts with the RDBMS using an embedded Structured Query Language (SQL) interface.

These and other features and advantages of the invention will be apparent to those skilled in the art from the following detailed description of a preferred embodiment, taken together with the accompanying drawings in which:

BRIEF DESCRIPTION OF DRAWINGS

FIGS. 7a and 7b are block diagrams showing the process of object translation between its primary and secondary memory representations according to the present invention.

DETAILED DESCRIPTION OF A PREFERRED EMBODIMENT

The present invention is applicable in the development of object-oriented application systems which require the management, persistence and sharing of complex and interrelated data. Before considering the present invention in detail, however, it should be noted that although the C++ implementation will be fully described, the preferred embodiment of the present invention can be implemented in any object-oriented programming language. Currently, a C++ implementation of the present invention runs on systems such as the Sun Microsystems Incorporated Sun4 or the Digital Equipment Corporation DEC3100 series of computer workstations. Also, a Common LISP implementation of the present invention runs on such systems as the Texas Instruments Incorporated Explorer series of computer workstations.

Figure 1:
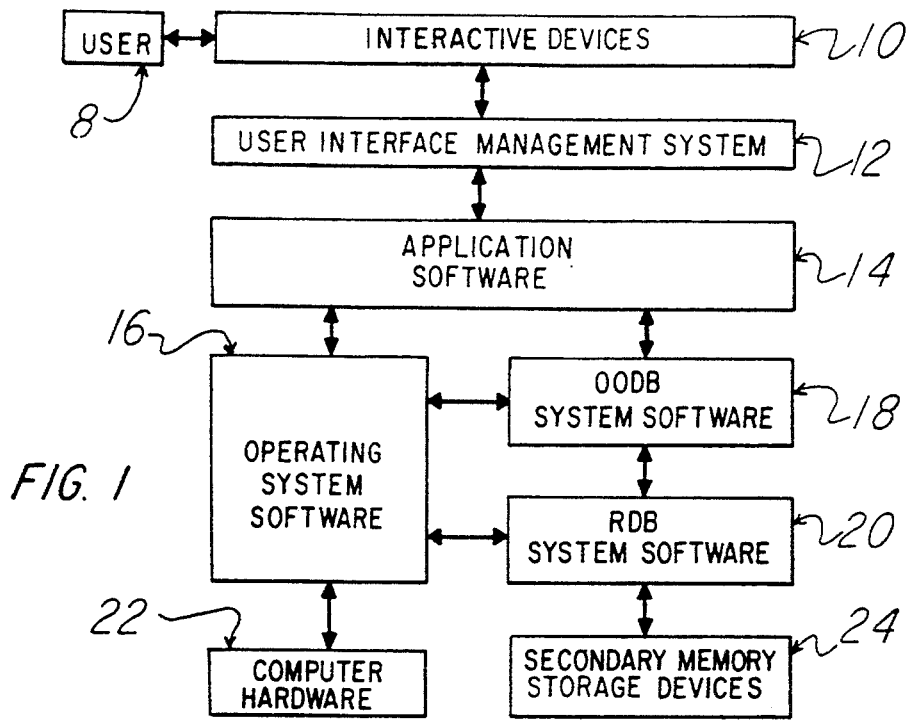
FIG. 1 is a block diagram showing the operating context of the present invention operates within a computer.

FIG. 1 shows a block diagram of the operating context of the present invention within a computer. A user 8, which may be human, another computer, or another application, interacts with the interactive devices 10 to send information to, and receive information from, user interface management system 12. Interactive devices 10 are also known as communication hardware. User interface management system 12, which is also known as communication software in turn sends the information to, and receives information from, an application software program 14 (hereinafter referred to as "application 14"). Application 14 interfaces with the computer's operating system software 16 (hereinafter referred to as "OS 16") and the present invention (hereinafter referred to as "OODB 18"). OODB 18 interfaces with OS 16 to utilize various operating system services. OODB 18 also interfaces with a Relational Database Management System Software 20 (hereinafter referred to as "RDBMS 20") to store and retrieve objects created by application 14. RDBMS 20 interfaces with operating system 16 to utilize various OS system services and with secondary memory storage devices 24 to physically store or retrieve the objects created by application 14 and managed by OODB 18. OS 16 also interfaces with additional computer hardware 22 as necessary to provide its system services to application 14, OODB 18, and RDBMS 20.

Figure 2:
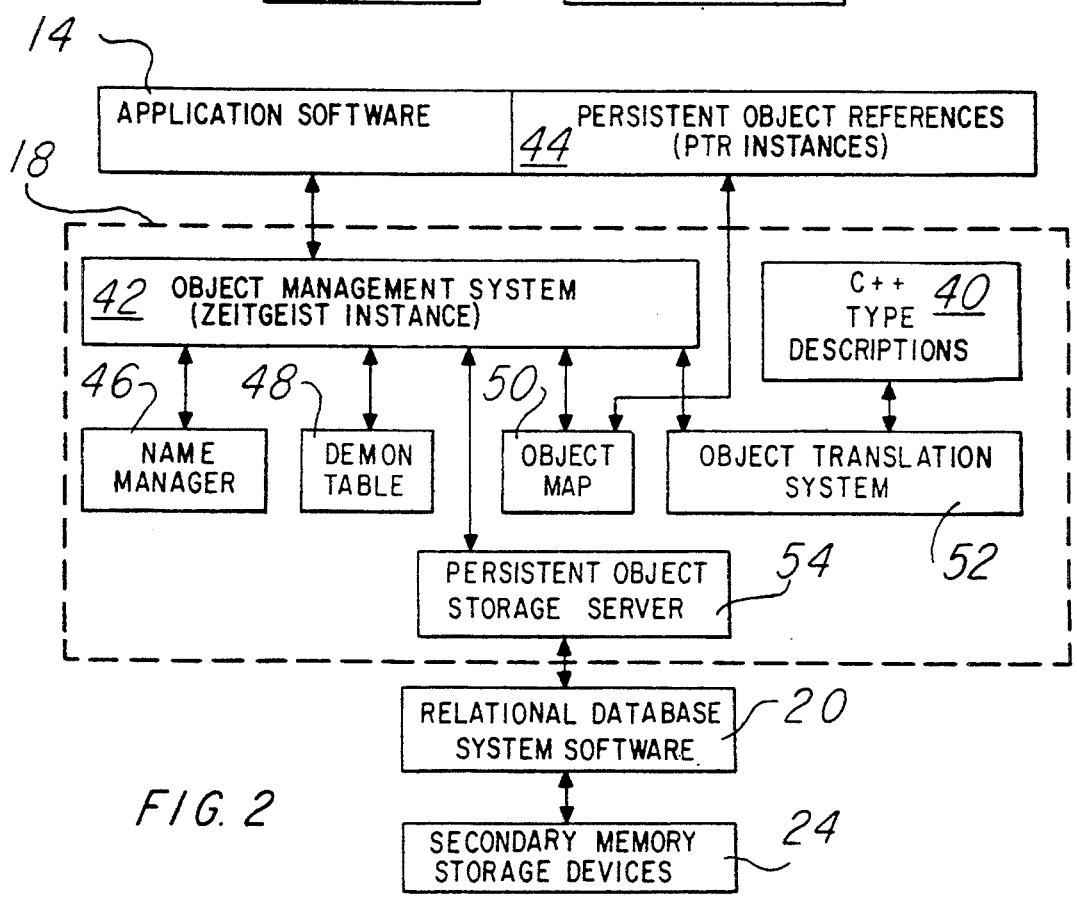
FIG. 2 is a block diagram of the architecture of a preferred embodiment of the present invention.

FIG. 2 shows a block diagram of the architecture of a preferred embodiment of the present invention during execution of application 14. All of the modules in OODB 18 are linked together along with a C++ type description 40 (hereinafter referred to as "types 40"), produced by running the data definition language translator (hereinafter referred to as "DDL 80"; shown in FIG. 3) on a set of application-defined classes, to form a library that can be linked with application 14 to form a program that can be executed in the computer environment shown in FIG. 1.

Application 14 interfaces directly with the object management system 42 (hereinafter referred to as "OMS 42") and creates or deletes Persistent Object References 44 (hereinafter referred to as "PTR 44") to create, retrieve, and access persistent objects managed by OMS 42.

OMS 42 interfaces with name manager 46 to manage an association of names supplied by application 14 with independent persistent objects created or retrieved by application 14 using PTRs 44. OMS 42 interfaces with demon table 48 to execute functions defined by application 14 and registered with OODB 18 by running DDL 80. OMS 42 also interfaces with object map 50 to manage the actual persistent objects referenced by PTR 44. OMS 42 further interfaces with object translation system 52 (hereinafter referred to as "OTS 52") to translate persistent objects between their primary and secondary memory representations. OTS interfaces with types 40 created by DDL 80. Finally, OMS 42 interfaces with persistent object server 54 (hereinafter referred to as "POS Server 54") to store and retrieve the persistent objects managed by OMS 42.

POS Server 54 interfaces with RDBMS 20 using a standard Structured Query Language (SQL) interface to physically store and retrieve the persistent objects managed by OMS 42. RDBMS 20 interfaces with secondary memory storage devices 24 to physically store and retrieve tile objects created by application 14 and managed by OODB 18.

The various modules of the present (DDL 80, OMS 42, name manager 46, demon table 48, object map 50, PTR 44, OTS 52, and POS Server 54) will now be considered in more detail.

Prior to developing an application system that interfaces with the present invention, the application developer must register the C++ classes to be used in the application system with the present invention. This is accomplished by executing the DDL translator described below.

The DDL Translator 80 (hereinafter referred to as "DDL 80") is based on three separate application programs that are executed in sequence (see FIG. 3). DDL 80 receives as input one or more data definition language source files 26 written by the developer of application 14. These source files 26 contain class definitions in the C++ language plus additional keywords and syntactic constructs defined by the present invention (see Table 1 for an example of such a DDL source file). DDL 80 then extracts sufficient information from source files 26 to generate a C++ source file 40 (hereinafter referred to as "types 40"; see Table 2 for an example of such a C++ source file) containing type description information for use by OMS 42 and OTS 52, and a set of C++ source files 38 for every class definition in the source file(s). These files are then subsequently used by the application programmer when writing, compiling, and executing C++ programs that create and manipulate instances of the classes, as well as save or retrieve them using the present invention.

Figure 3:
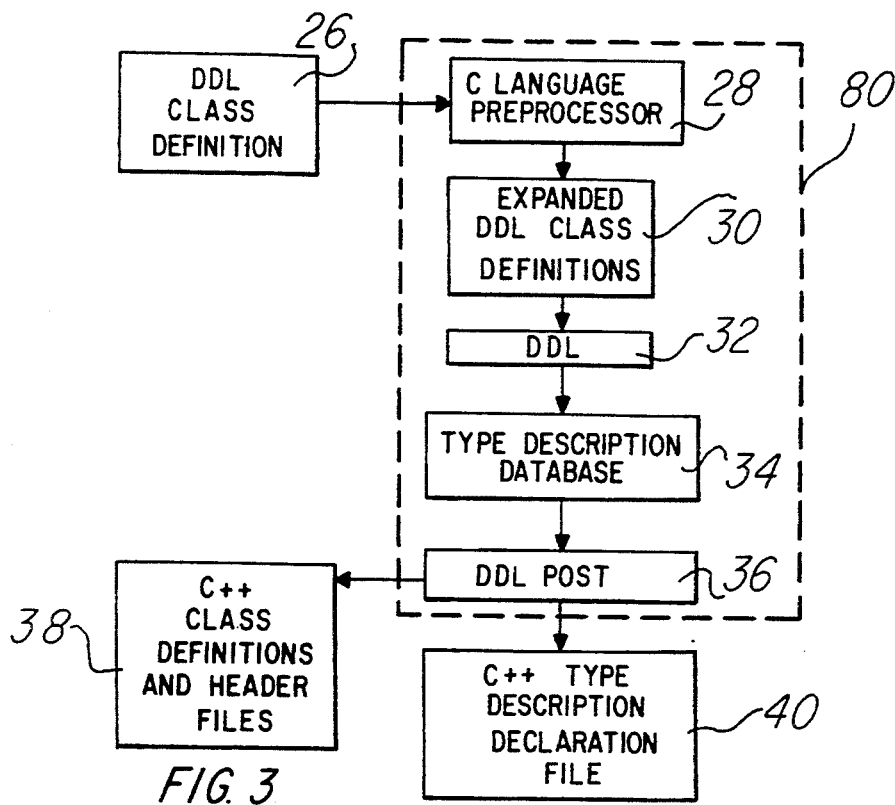
FIG. 3 is a flow chart depicting the process flow of the DDL translator during execution according to the present invention.

The first program in the sequence depicted in FIG. 3 is the commercially available C language preprocessor cpp 28. This program receives as input source files 26 and produces a copy of the input file(s) with all cpp directives evaluated and expanded (expanded file 30). Use of this program in the present invention does not require any modification.

TABLE 1

--- class ptrs : persistent                  // to indicate independent persistence

TABLE 1-continued

```
{
private:
     int  len;                         // controls length of data member 'mpd'
     // Pointers to array of data types
     char  *[10] cpd;                  // constant length
     char  *[len] mpd;                 // length controlled by data member 'len'
     char  *[sentinel' 0'] spd;        // length terminated by hexadecimal zero
     boundary char *bpd;               // referenced data is ignored when saved
     classPTR pers_ref;                // reference To independent persistent object
public:
// Definition of Demon functions
demon create  int setup();             // creation time demon
demon restore int resetup();           // fetch time demon
demon commit  int ready ();            // commit time demon
demon abort   int cleanup 1);          //abort time demon
};
```

TABLE 2

```
char *Type-Descriptions[] = {  /* DDL RELEASE 0.1.5 */
/* 0-2: OCDB Classes */
"16|&|0|1|0|1|254|0|.|&|7|0|4|1|255|1|1|&|7|0|8|1|255|1|0|&",
"24|&|0|1|0|1|254|0|.|&|7|0|16|1|255|1|1|&|7|3|20|1|255|1|1|&~,
"8|&|7|3|0|1|.|.|2|&",
/* 3: User Class A */
"12|&|7|3|0|1|.|.|3|&",
/* 4: User Class B */
"8|&|7|3|0|1|.|.|4|&",
/* 5: User Class C */
"12|&|7|3|8|1|.|.|5|&",
};
Interpretation of Fields
"12|&|7|3|8|1|.|.|5|&'
 | | | | | | |
 | | | | | | |Index into this array of referenced data
 | | | | | |Number of instances in the array
 | | | | |How to determine number of instances in array
 | | | |Number of dimensions in array
 | | |Offset of this pointer or PTR
 | |Type of pointer
 |Data type of referenced data
|Size of an instance of this class
```

The second program in the sequence is the DDL processor ddl 32. This program receives as input expanded file 30 produced by the first program, scans expanded file 30 for specific information, and generates a typeobject database 34 for use by the third program, ddlpost 36. The ddl 32 program uses a lexical scanner based on the lexical analysis program generator lex (not shown) to scan source files 26 and return each token (syntactic unit not shown) to the main functions of ddl 32. In addition to scanning source files 26 for specific information, ddl 32 performs full syntactic and limited semantic checking on the input file, and generates appropriate error and warning messages.

ddl 32 processes each class definition in the input file as follows. First, it scans the input tokens until it recognizes the C++ keyword "class". If the "class" keyword is found, ddl 32 continues to scan for and then extract the class name, the name(s) of any classes from which this class is to be derived, and a keyword, "persistent", that indicates whether or not instances of this class should become "independent persistent objects" (IPO) when saved to the database. If this class is derived from another class and does not have the "persistent" keyword, ddl 32 determines if the latter class is also a persistent class. If so, this class is marked as an persistent class. If "persistent" is not present and if this class is not derived from a persistent class, instances of this class can still be saved to the database, but they will become "dependent persistent objects" (DPO) physically stored with an IPO. If the class(es) from which this class is to be derived has(have) not been previously processed by ddl 32 in this file or in previous executions of DDL 80, an error message is generated.

Second, ddl 32 scans the rest of the class definition for the declarations of data members and extracts the name of the data member, the name of the data type (fundamental C++ or user-defined type, including classes), and then determines the class's memory alignment, size, padding between it and the next data member, and its offset from the beginning of the class. ddl 32 also extracts information indicating if the data member is an array, the number of elements in the array, if the data member is a C++ pointer, the name of the data type of the referenced data, the number of data items referenced by the pointer (which can be specified by a sentinel, a decimal or hexadecimal value, or the name of a integer data member in this class), whether it has the keyword "boundary" before it (the referenced data will not be saved if an instance of this class is saved to the database), or if the data member is a PTR 44, the name of the referenced class. Unless the data types used for data members or referenced from this class (using C++ pointers or PTRs 44) have been processed by DDL 32 during the eighth step discussed below, an error message is generated.

Third, if ddl 32 determines that any of the data members are in the public portion of the class definition, an error message will be generated and the class definition will not be processed during the eighth step discussed below. Fourth, ddl 32 also scans for the existence of the C++ keyword "virtual" before any function declaration inside the class definition, as this keyword affects the overall size of an instance of this class. Fifth, ddl 32 also scans for the existence of the keyword "demon" before any function declaration inside the class definition and notes this for later processing by ddlpost 36.

Sixth, once the entire class definition has been scanned, ddl 32 computes the size for instances of this class by adding the size of all classes from which this class derives (retrieved from the type description database) to the size of all data members in this class (if the data member is an embedded instance of a class, the size is retrieved from the type description database). If this class has virtual functions (as detected in the fourth step discussed above), the size of the class is increased by an amount equal to the size of a C++ pointer to a C++ virtual table pointer. If the keyword "persistent" is present (as detected in the first step discussed above), the size of the class is increased by an amount equal to the size of an instance of the PTR 44 class. The alignment and padding of this class are then calculated based on the overall size computed.

Seventh, these scanning and extraction steps continue until the end of the expanded file 30 is encountered.

Eighth, after all class definitions are scanned and the end of the input file is encountered, ddl 32 then generates and outputs the following information into type description database 34: the name of the class, the size, alignment, and padding information for the entire class, a string containing information on every C++ pointer and PTR included in the class, the names of all classes or structures that this class references (using C++ pointers or PTRs) or contains, the names of functions defined for the various demons supported by the present invention, and a copy of the entire class definition from source file 26.

The third program in the sequence is ddlpost 36 which receives as input type description 34 generated by ddl 32 and generates C++ source and header files source files 38 and types 40 as follows.

First, ddlpost 36 reads the contents of type description 34 and creates data structures to hold the information. Second, for every class in type description database 34, source files 38 is produced, which may be composed of two separate C++ source files.

If the file is a persistent class, a C++ header file is produced containing the definition of a new class derived from the PTR 44 class. This file is produced by editing a predefined template file (see Table 3) using a stream editor to convert certain character strings in the template file to the name of this class. A second C++ header file is produced that contains cpp 28 include directives for every class from which this class is derived, is used as the data type for a data member, or is referenced by a C++ pointer or PTR 44; the class definition; and C++ statements to allow the PTR 44 class functions to manipulate instances of this class. If this class has demons, this second C++ header file is also includes C++ statements to allow the Demon class functions to manipulate instances of this class. Similarly, if this class is persistent, this second C++ header file also contains definitions for the PTR 44 class functions generated in the above-described PTR 44 file.

TABLE 3

```
--#include "zg-ptr.h"
// The $PTR class
class $;
class $PTR: public ?
{
    public:
        /* methods */
        $& operator* ();
        $* operator→ ();
        $PTR& operator=(Zg-Eo&);
        $PTR& operator=($ *);
        $PTR& operator=($PTR &);
        operator $* ();
        void make-absent ();
        /* constructors & destructors */
        inline $PTR ()
        inline $PTR ($ *);
    private:
        #
        /* friends */
        friend $PTR& persist ($& object, zg-Uint sg=0);
};
```

The '$' are replaced with the name of the user defined class.
The '?' is replaced with the name(s) of class from which this class is derived.
The '#' is replaced with a C++ class definition if this class has defined Demons.

This second C++ source file is temporary and is produced by appending the first item to the file based on the information extracted in the first two steps of ddl 32. The second item is then appended to the file as obtained from type description database 34 (sixth item in type description database 34). The third item is appended to the file by generating a temporary file which resulted from editing a predefined template file (see Table 4) using a stream editor to convert certain character strings in the template file to the name of this class. The final two items are appended to the file in a similar manner.

TABLE 4

```
--inline $PTR::$PTR ()
{
    #
    eop→teop = eop→init-teop (1, @, 0);
}
inline $& $PTR::operator* ()
{
    return (*(($ *) (eop→rop ? eop→rop : fault ())));
}
inline $* $PTR::operator→()
{
    return (( $ *) (eop→rop ? eop→rop : fault ()));
}
inline $PTR& $PTR::operator= (Zg-Eo& rhs)
{
    return (($PTR&) this→assign-eo (rhs));
}
inline $PTR& $PTR::operator= ($PTR& rhs)
{
```

TABLE 4-continued

```
    return (($PTR&) this→assign-ptr (rhs));
}
inline $PTR& $PTR::operator= ($* rhs)
{
    if (rhs = = NULL) return (($PTR&) this→assign-null ());
    else return (($PTR&) this>assign-star (rhs, rhs→thisptr));
}
inline $PTR::operator $* ()
{
    return (($ *) (eop→rop?eop→rop:(eop→oid= =NullOid?NULL:fault())));
}
inline void $PTR::make-absent ()
{
    if (!this→remove-object ()) delete ($ *) this→eop→rop;
    this→eop→rop = NULL;
}
inline $PTR::$PTR ($* rhs)
{
    *this = rhs;
}
inline $PTR& persist ($& object, Zg-Uint sg)
{
    return (($PTR&) object.thisptr.set-persist (&object, sg));
}
```

The'$' are replaced with the name of the user defined class
The '#' is replaced with a C++ statement if this class has
defined Demons.

Third, after all classes in type description database 34 have been processed, C++ source file types 40 is generated containing C++ statements which define an array of character strings that contains the type descriptions of the classes processed, as described above in connection with the eighth step of ddl 32. This file is compiled by the application developer and linked with the software modules of application 14 and OODB 18 to allow the array to be used by OMS 42 and OTS 52 during execution of application 14 interfacing with OODB 18.

Although eight processing steps are discussed with regard to ddl 32, to extract the class and type description information, the same effect could be achieved by combining steps.

The application program interfaces with one instance of OMS 42 as well as numerous instances of PTR 44 to create, manipulate, store, and retrieve persistent objects. Each independent persistent object created by the application is assigned an object ID 78. Each object ID 78 is composed of a storage group number (indicates in which storage group the object is stored), an object number (indicates the specific object within the storage group), and a time stamp (indicates the time that object was saved to the database). Each of these fields is represented by a 32 bit unsigned integer value. A NULL object ID 78 is used to indicate the absence of a valid object ID. In addition, an encapsulation 62 (hereinafter referred to as "encapsulation 62") is created and associated with each independent persistent object. Encapsulations 62 are described later during the description of PTRs 44.

An instance of OMS 40 contains the following data members:

Architecture ID is a reference to information describing the architecture of the current computer hardware. This data member is added to the database when the database is originally initialized for use with the current computer hardware. This data member is used by OTS 52 when translating objects between their primary and secondary memory representations.

Default storage group contains the number of the storage group where objects will be stored by default. It can be set using Default-Storage-Group 108.

Name manager is a reference to name manager 46 for this instance of OMS 40. It can be set using Name-Manager 116.

Demon table is a reference to demon table 48 for this instance of the OMS 40. It is set during Create 100 and used during Create 300 (described later), Commit-Transaction 112, Abort-Transaction 114, and Fetch 120–124.

Object map is a reference to object map 50 for this instance of OMS 40. It is set during ZG-Create 100 and used by OMS 42.

Transaction Id contains the current transaction number. It is used during Begin-Transaction 110, Commit-Transaction 112, and Abort-Transaction 114.

POS Server is a reference to an instance of POS Server 54. It is set during Create 100 and used by OMS 42 to store or retrieve objects in the database.

Active indicates whether or not this instance of OMS 40 is active; that is, Startup 102 has been called before a call to Shutdown 106 has been made.

There is also a global variable named Exists that indicates whether or not an instance of OMS 40 has been created by application 14. This variable is checked during Startup 102.

Table 5 lists interface functions 100–130 together with their function names and arguments, which OMS 42 provides to application 14. A description of each function is given below. These functions either update the private state or return some information about the private state of an instance of OMS 42. Interface functions 100–128 update the private state of the instance, while interface function 130 returns information about the private state of the instance to application programs. In most functions, error checking is performed after most individual actions. Error checking is not considered fundamental to the understanding of and operation of the present invention, and will therefore not be further described.

TABLE 5

| | OMS Application Interface Functions | |
|---|---|---|
| | Name | Argument |
| 100 | Create | none |
| 102 | Startup | none |
| 104 | Delete | none |
| 106 | Shutdown | none |
| 108 | Default-Storage-Group | Storage Group |
| 110 | Begin-Transaction | none |
| 112 | Commit-Transaction | none |
| 114 | Abort-Transaction | none |
| 116 | Name-Manager | Name Manager |
| 118 | Default-Name-Context | Name Context |
| 120 | Fetch | Object Name, Lock, Time Context |
| 122 | Fetch | PTR, Lock, Time Context |
| 124 | Fetch | Object ID, Lock, Time Context |
| 126 | Lock-State | Object Name, Time Context |
| 128 | Lock-State | PTR, Time Context |
| 130 | Time | none |

Create 100 creates an instance of OMS 42. This function is called whenever an instance of OMS 42 is created statically, automatically, or dynamically, depending on the C++ variable declaration used in the application program. During creation, function Startup 102 is called.

Startup 102 can also be called at any time after Shutdown 106 is called. Since only one OMS 42 instance is allowed per application program, the value of the Exists global variable is checked to see if one already exists. If one does exist, an error value is returned. If one does not exist, the default storage group data member is set to the minimum storage group number if this is the first time an OMS 42 instance is being created. If the current OMS 42 instance had previously been created during this execution of application 14, the previous value in the default storage group data member will be used. Demon table 48 and object map 50 are created and assigned to their associated data members. Next, an instance of POS Server 54 is created and assigned to the POS Server data member. The architecture ID object for the computer hardware within which application 14 and OODB 18 are executing is retrieved from POS Server 54 and assigned to the architecture ID data member. An instance of name manager 46 is created and assigned to the name manager data member. Begin-Transaction 110 is called, followed by a call to Default-Name-Context 116 to create the default name context in the database. If this is the first time this database has been used, a call is made to Commit-Transaction 112 to save the new default name context in the database. If not, Abort-Transaction 114 is called. Finally, the active data member is set to indicate that this instance of OMS 42 is active, the exists global variable is set to indicate that an instance of OMS 42 exists, and control is returned to the caller of this function.

Delete 104 deletes an instance of OMS 42. This function is called whenever an OMS 42 instance is deleted statically, automatically, or dynamically, depending on the C++ variable declaration used in the application program. During deletion, function Shutdown 106 is called.

Shutdown 106 checks the value of the Active data member to determine whether this instance of OMS 42 is active. If it is not, control is returned immediately to the caller of this function, as no work must be performed. If this instance is active, for every encapsulation 62 currently in object map 50, its modified data member is set to "Not Modified" and then encapsulation 62 is deleted. name manager 46, object map 50, and POS Server 54 are deleted and their associated data members are set to a null pointer, thereby indicating that the value is not valid. Finally, the transaction ID data member is to zero, the active data member is set to indicate that this instance of OMS 42 is inactive, and control is returned to the caller of this function.

Default-Storage-Group 108 updates the private state of this instance of OMS 42 as follows. If the supplied storage group number is greater than the minimum storage group number, Is-Sg-Valid 504 is called to insure that a storage group with that number exists in the database. If one does exist, the default storage group data member is assigned using the supplied storage group number and the previous value of this data member is returned. Otherwise, a value of 0 (zero) is returned.

Begin-Transaction 110 is used to mark the beginning boundary of a transaction. All interactions between the application program and OMS 42 must occur within a transaction. Begin-Transaction 516 is called to insure that POS Server 54 begins a transaction. If the call succeeds, the transaction ID data member is incremented by one and that value is returned. Otherwise, a value of −1 is returned.

Commit-Transaction 112 is used to mark the ending boundary of a transaction. If the transaction ID data member indicates that there is not a current transaction, a value of −1 is returned. Otherwise, an instance of POS Encapsulation 70 (herein referred to as "POS encapsulation 70"; discussed below) is created if one does not already exist. Next, every encapsulation 62 in object map 50 is examined to determine how many do not have an object ID 78 (those objects which have been created by the application program since the last call to Commit-Transaction). If the number is greater than zero, Alloc-Symbolic-Name 506 is called. If the requested number of object IDs 78 could not be obtained, an error is returned. If the call was successful, Begin-Commit 508 is called, which returns a timestamp for this commit (which will be saved in each POS encapsulation 70 during translation), or a error value. For every encapsulation 62 currently in object map 50, the following actions take place. If the modified data member in encapsulation 62 indicates that the object has not been modified, it is bypassed for processing. Otherwise, if the concurrent lock data member in the encapsulation 62 indicates that the application program does not have a WRITE lock on the object, an error is returned since the application program must have a WRITE lock on all objects in order to create new versions of them in the database. Otherwise, if a Commit Demon for the object's type was registered in de,non table 48, that Commit Demon is called (see description of demon table 48). Next, OTS Internal2External is called and passed POS encapsulation 70, which it updates with an external representation 402 of the object. If the translation succeeds, Put-Object 514 is called to create a new version of the object in the database. After every encapsulation 62 in object map 50 has been processed in this manner, End-Commit 510 is called to commit the changes to the database, followed by a call to End-Transaction 510 to end POS Server's 54 transaction. Since the transaction has completed, other application programs may retrieve the objects from the database, update them, and create new versions of them. Versions accessible through this instance of OMS 42 are then considered invalid. Thus, for each encapsulation 62 currently in Object Map 50, the following actions take place. The concurrent lock data member is set to "Invalid" and the modified data member is set to "Not Modified". If the number of references to this encapsulation 62 from the application program is greater than zero, the object is deleted if OMS 42 created it. Otherwise, the object pointer data member in encapsulation 62 is set to null. If the number of references is zero, encapsulation 62 is deleted, which may delete the object if OMS 42 created it. Finally, the transaction ID data member is decremented by one and the number of objects committed to the database is returned.

Abort-Transaction 114 is also used to mark the ending boundary of a transaction but does not commit any objects to the database. If the transaction ID data member indicates there is not a current transaction, a value of −1 is returned. Otherwise, for every encapsulation 62 currently in object map 50, if an Abort Demon for the object's type was registered in demon table 48, that Abort Demon is called. Next, the concurrent lock data member is set to "Invalid" and the modified data member is set to "Not Modified". Finally, Abort-Transaction 520 is called to allow POS Server 54 to terminate its current transaction, the transaction ID data member is decremented by one, and control is returned to the caller of this function.

Name-Manager 116 simply assigns the name manager data member to the supplied instance of name manager 46 and returns the previous value of this data member.

Default-Name-Context 118 calls Name-Context 204, to ensure that the supplied name context exists, and returns.

Fetch 120–124 has three forms. The first takes an object name, the second takes a PTR 44 associated with an object, and the third takes an object ID 78 of an object. The first form calls Return-OID 210 which returns object ID 78 of the supplied object name, or a null object ID 78 if the user-defined name had not been registered, in which case a null address is returned. The second form retrieves object ID 78 from encapsulation 62 associated with supplied PTR 44. In any case, the following actions occur once an object ID 78 has been obtained. Encapsulation 62 associated with object ID 78 is retrieved from object map 50 and the object pointer data member is checked to determine if the associated object is or is not in primary memory. If the value indicates that it is in primary memory, the address of the object in primary memory is returned. If the value indicates that it is not in primary memory, Get-Object 512 is called with the supplied lock and time context (which default to READ and MOST-RECENT, respectively) and returns a POS encapsulation 70 (which contains the object's external representation 402 and its references to other persistent objects). Next, OTS External2Internal is called with POS encapsulation 70 to create a primary memory representation of the object using the object's external representation 402 in POS encapsulation 70. The references to other persistent objects are registered with OMS if they have not already been registered. Finally, the modified and deleteable data members of encapsulation 62 are set to "False" and "True", respectively (since OMS 42 just created the object), and the address of the object in primary memory is returned.

Lock-State 126–128 has two forms similar to Fetch 120–124. The first takes an object name, while the second takes a PTR 44 associated with an object. As in Fetch 120–124, the first form calls Return-OID 210 to return object ID 78 of the supplied object name or a null object ID 78 if the user-defined name had not been registered, in which case a value indicating that application 14 does not currently have a valid lock on the object is returned. The second form retrieves object ID 78 from encapsulation 62 associated with the supplied PTR. In any case, encapsulation 62 associated with object ID 78 is retrieved from object map 50 and the concurrent lock data member is checked to determine if the application program currently has a valid lock on the object. If so, the value of the concurrent lock data member is returned. Otherwise, a value indicating that the application does not currently have a valid lock on the object is returned.

Time 130 returns the current time received from OS 16.

OMS 42 interacts with name manager 46 to manage the association of names supplied by the application with independent persistent objects created or retrieved by application 14 using PTRs 44.

An instance of Name Manager 46 contains the following data members:

First context references the first name context in a list of all name contexts defined in the database currently being accessed by application 14 using the present invention. It is set during Create 200 and accessed when searching for name contexts or name entries.

Current context references the current name context in a list of all name contexts defined in the database currently being accessed by application 14 using the present invention. It is set during Create 200 to the first context and during Name-Context 204 to the new default name context. It is accessed when searching for name entries.

Table 6 lists interface functions 200–210, with their function names and arguments, which name manager 46 provides to OMS 42. A description of each function is given below. These functions either update or return some information about the private state of an instance of the name manager class. Interface functions 200–208 update the private state of the instance, while interface function 210 returns information about the private state of the instance to application programs.

TABLE 6

| Name Manager Interface Functions | | |
|---|---|---|
| | Name | Argument |
| 200 | Create | none |
| 202 | Delete | none |
| 204 | Name-Context | Context Name |
| 206 | Name | Object Name, Object Oid |
| 208 | Unname | Object Name, Object Id |
| 210 | Return-OID | Object Name |

Create 200 creates an instance of a name manager 46 as follows. Begin-Transaction 110 is called and then Fetch 124 is called to retrieve the default root context. If the default root context does not exist, one is created, assigned to the first context data member, a new object ID 78 obtained by indirectly calling Alloc-Symbolic-Name 506, and Commit-Transaction 112 is called to save the default root context in the database. If tile default root context already exists, Abort-Transaction 114 is called. Finally, the current context data member is set to the new or previously existing default root context object and control is returned to the caller of this function.

Delete 202 simply deletes the supplied instance of name manager 46.

Name-Context 204 searches the list of contexts, accessible from the first context data member, for an context entry which has the supplied context name. If the context name is in an entry, a 0 (zero) is returned. If it is not in any entry, a new context entry is created using the supplied context name. It is added to the front of the list of contexts, the current context data member is assigned to the new context entry, and a 1 (one) is returned.

Name 206 accesses the current context data member's list of name entries and searches for a name entry which has the supplied object name. If the object name is in an entry, a −1 is returned since no duplicate object names are allowed. If it is not in any entry, a new name entry is created using the supplied object name and object ID 78 and added to the end of the list. A 0 (zero) is returned.

Unname 208 accesses the current Context data member's list of name entries and searches for a name entry which has the supplied object name. If the object name is not in an entry, a −1 is returned. If it is in an entry and the object ID 78 in the entry matches supplied object ID 78, the name entry is deleted from the list and a 0 (zero) is returned. If the two object ID 78s did not match, a −1 is returned.

Return-object ID 210 accesses the current context data member's list of name entries and searches for a name entry which has the supplied object Name. If the object name is not in an entry, a null object ID 78 is returned. If it is in an entry, object ID 78 in the name entry is returned.

Figure 4:
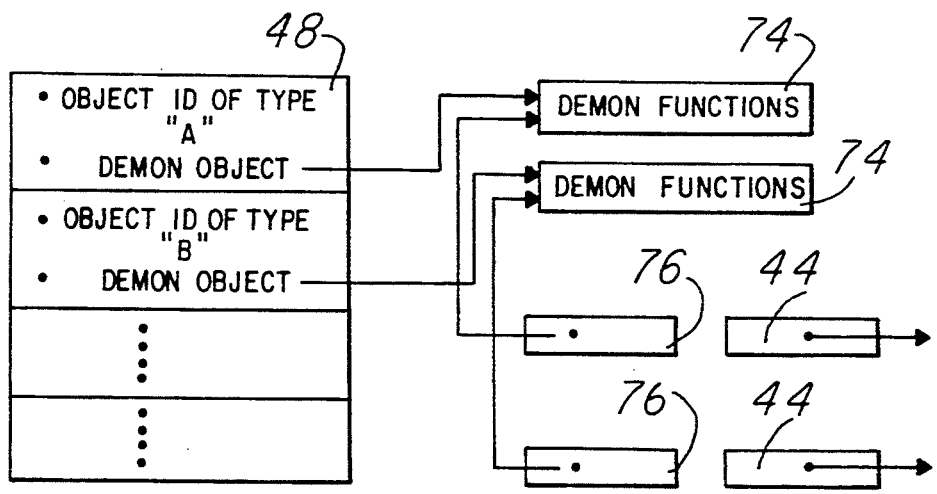
FIG. 4 is a block diagram representing an example of a demon table used within the OMS module of the present invention.

FIG. 4 is a block diagram of demon table 48 used by OMS 42 during certain OMS 42 functions. Demon table 48 is an array of entries that contains two data members: an object ID 78 for a user-defined type or class, and a reference to demon object 74.

During the DDL translation process, the application developer can add the keyword "demon" and an event keyword before a class function name (see Table 4 above, bottom portion of the class declaration). Classes with these demon keywords are referred to as "demon classes". The existence of these keywords is recognized by DDL and the names of the associated functions are added to type description database 34. During execution of ddlpost 36, additional C++ statements and functions are added to source files 38 for each class annotated with the demon keywords. First, an additional data member, PTR Demon 76, is defined that will be shared by all instances of this class' PTRs 44 during execution of an application program using this class. Second, another class, demon object 74, is defined and includes functions which will call the user-defined functions named in the original class definition.

Prior to execution of application 14, the application developer compiles source files 38 and links them with the software modules of application 14 and OODB 18. After execution of application 14 is started, code required to statically create instances of PTRs 76 is executed (this is the code generated in source files 38). During execution of application 14, whenever an instance of OMS 42, an instance of demon table 48 is initialized. Whenever an instance of a demon class PTR 44 is created by the application program, the value of its associated PTR Demon 76 is checked to see if an instance of demon object 74 exists. If one does exist, processing continues. If one does not exist, one is created and PTR Demon 76 is set to reference new demon object 74. When demon object 74 is created, an entry is added to demon table 48. Object ID 78 data member is set to object ID 78 of the type description object (in Types 40) for this demon class, while the demon object reference data member is set to the newly created instance of demon object 74.

While processing persistent objects during certain OMS 42 functions, OMS 42 checks demon table 48 to see if a demon object 74 for the type of the persistent object has been registered. It accomplishes this by comparing object ID 78 of the type description for the given object and object IDs 78 in demon table 48. If there is not a match, processing of the given object continues. However, if there is a match, OMS 42 will call one of the demon functions as specified in the demon object 74 referenced from the appropriate demon table 48 entry. The demon function can then manipulate the object prior to OMS 42 continuing with its processing.

Figure 5:
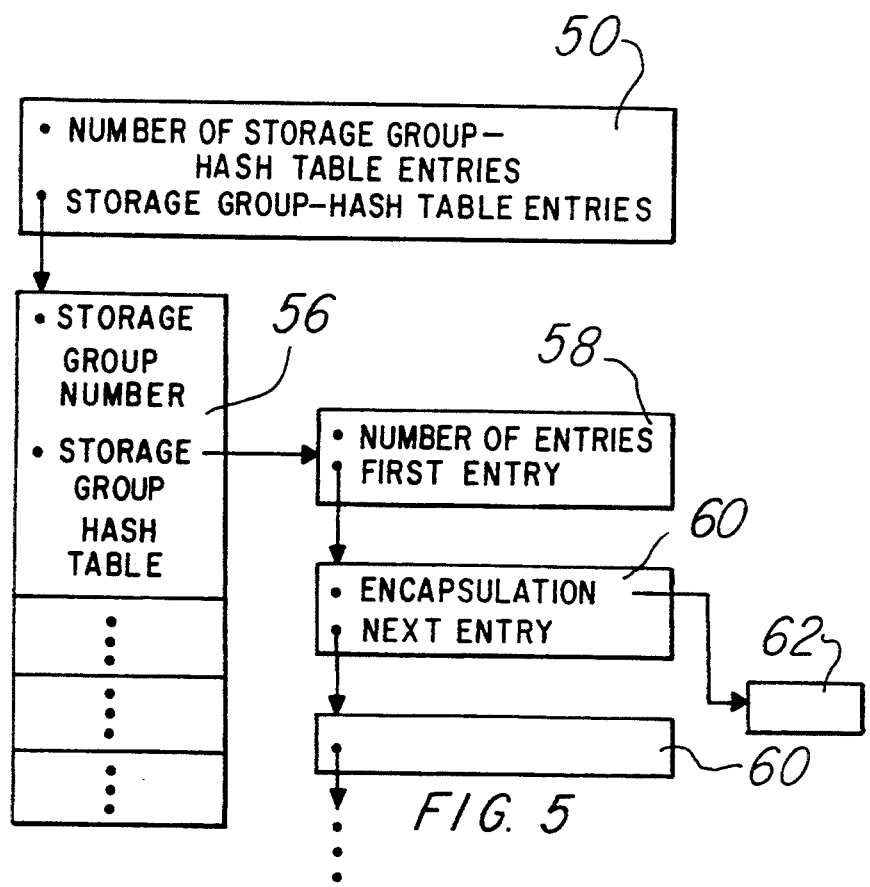
FIG. 5 is a block diagram representing an example of an object map used within the OMS module of the present invention.

FIG. 5 is a block diagram of object map 50 used by OMS 42. Object map 50 manages encapsulations 62 created when an independent persistent object is created by application 14 or retrieved from the database. Object map 50 is constructed as a two-level index based on storage group and object number. The first level is array whose elements are records containing a storage group number and a pointer to a storage group hash table 58. The second level is storage group hash table 58 whose entries 60 contain pointers to encapsulations 62 and the next entry 60 in hash table 58. The interface provided by object map 26 to OMS 42 is as follows:

Add Encapsulation locates the appropriate hash table 56 (creating a new one if necessary), creates new entry 60, associates it with supplied encapsulation 62, and adds it to storage group hash table 58.

Find Encapsulation locates the appropriate hash table object map 58 and searches hash table 58's entries 60 for one that references encapsulation 62 which has the same object ID 78 as the supplied object ID 78. If an entry 60 is found, the address of the associated encapsulation 62 is returned. If an entry is not found, or there is not a hash table 58 for the supplied storage group, a null address is returned.

Remove Encapsulation locates the appropriate hash table 58 and searches hash table 58's entries 60 for one that references encapsulation 62 which has the same object ID 78 as the supplied object ID 78. If an entry 60 is found, entry 60 is removed from storage group hash table 58 and deleted. No action occurs if an entry 60 is not found.

As described earlier, application 14 creates instances of PTR 44 to create, manipulate, store, and retrieve persistent objects using the present invention. As can been seen in FIG. 6, an instance of a PTR 44 contains only one data member, encapsulation, which references an instance of the encapsulation class (encapsulation 62).

An instance of encapsulation 62 contains the following data members.

Type (class) description ID references a limited description of the definition of the C++ class of which this object is an instance. Specifically, it is a C++ pointer to a character string that contains information on every C++ pointer and PTR 44 in an instance of the class type of the object referenced via the Object Pointer data member. It is extracted from types 40.

Number of references to encapsulation 62 is incremented by 1 (one) every time a PTR 44 is created that references encapsulation 62, and decremented by 1

(one) every time a PTR 44 that references encapsulation 62 is deleted.

Concurrent lock indicates the current lock held on the object associated with the encapsulation. It is set when encapsulation 62 is created, when an object is retrieved from the database, or when a lock is upgraded.

Time stamp indicates the time that the associated object was saved to the database.

Object identifier is object ID 78 of the object associated with this PTR 44.

Object pointer is a C++ pointer that references the primary memory representation of the associated object. Unless the value is null (thereby indicating that the value is not valied), the associated object is resident in primary memory.

Persistent indicates whether this persistent object should be saved or already has been saved to the database. It is set by calling Persist 304.

Modified indicates whether this persistent object has been modified by application 14. Newly-created persistent objects are marked as "Modified", while persistent objects retrieved from the database are marked as "Not Modified". Persistent objects can be marked as "Not Modified" by calling Set-Modified 310.

Deleteable indicates whether OMS 42 can delete this persistent object from primary memory. If application 14 created this object, OMS 42 cannot delete it. If OMS 42 created the object (when retrieving it from the database), it can delete the persistent object.

Figure 6:
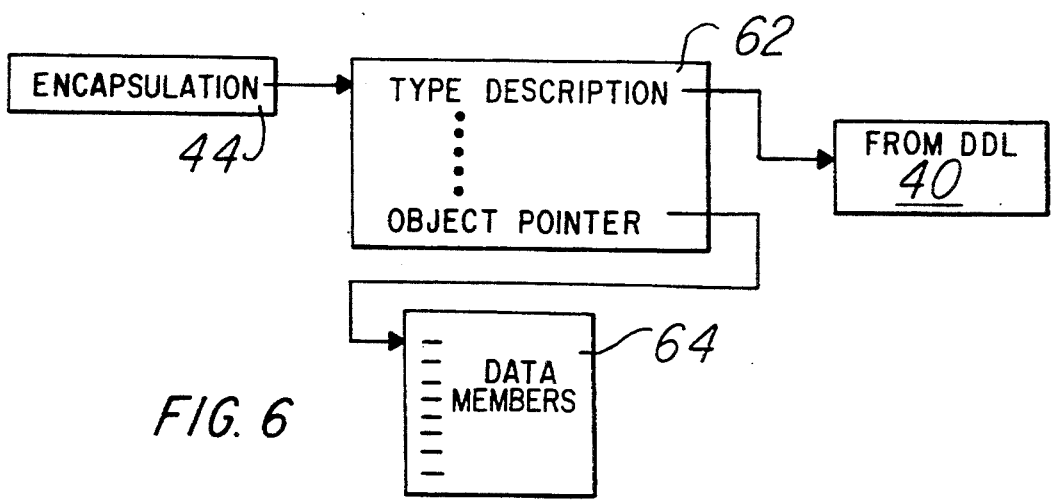
FIG. 6 is a block diagram depicting an example of the relationships between a PTR, an encapsulation, an object, and the type description of that object according to the present invention.

Therefore, it can be seen in FIG. 6 that given a PTR 44, one can access its associated encapsulation 62, and from there, access the associated object 64.

Table 7 lists interface functions 300–326 together with their function names and arguments, which PTR 44 provides to application 14. A description of each function is given below. These functions either update the private state or return some information about the private state of PTR 44. Interface functions 300–310, 316, and 320–322 update the private state of PTR 44, while Interface functions 312, 314, 318, 324, and 326 return information about the private state of PTR 44 to application 14.

TABLE 7

| PTR Application Interface Functions | | |
|---|---|---|
| | Name | Argument |
| 300 | Create | none |
| 302 | Delete | none |
| 304 | Persist | Object, Storage Group |
| 306 | Name | Object Name |
| 308 | Unname | Object Name |
| 310 | Set-Modified | none |
| 312 | Is-Modified | none |
| 314 | Lock-State | none |
| 316 | Upgrade-Lock | New Lock |
| 318 | In-Memory | none |
| 320 | Make-Absent | none |
| 322 | Make-Present | none |
| 324 | Timecontext | none |
| 326 | Timestamp | none |

Create 300 creates an instance of PTR 44 for application 14 to reference objects. Instances are created statically, automatically, or dynamically, depending on the C++ variable declaration used in application 14. First, an encapsulation 62 is created and assigned to the encapsulation data member. Next, encapsulation 62 for the type description object (in types 40) for this PTR's 44 class definition is obtained from object map 50, assigned to the associated encapsulation's 62 type description ID data member, and control is returned to the caller of this function.

Delete 302 deletes an instance of PTR 44 class. If there are not any references to encapsulation 62 by any other PTRs 44, encapsulation 62 is removed from object map 50. If the deleteable data member of encapsulation 62 indicates that associated object 64 was created by OMS 42, object 64 is deleted. Finally, encapsulation 62 is deleted and control is returned to the caller of this function.

Persist 304 is used to indicate that supplied object 64 should be saved to the database when the next Commit-Transaction 112 is performed. First, the persistent data member of encapsulation 62 is set to "True". Then, POS Alloc-Symbolic-Name 506 is called to obtain object ID 78 for the object, using the supplied storage group number or the value of the default storage group data member of OMS 42, if one was not supplied. Finally, if a Persist Demon for the object's type was registered in demon table 48, that persist demon is called, and control is returned to the caller of this function.

Name 306 associates the supplied object name with object 64 with PTR 44. Since names may only be associated with independent persistent objects, if the object ID data member of associated encapsulation 62 is null object ID 78, POS Alloc-Symbolic-Name 506 is called to obtain object ID 78 for object 64. Next, Name 206 is called to create the new name and control is returned to the caller of this function.

Unname 308 dissociates the supplied object name from object 64 associated with PTR 44 by calling Unname 208, and returns control to the caller of this function.

Set-Modified 310 shows that the application program has modified object 64 (this is checked during Zeitgeist Commit-Transaction 112 processing). First, the modified data member of encapsulation 62 is set to "True", Upgrade-Lock 212 is called requesting a WRITE lock, and then control is returned to the caller of this function.

Is-Modified 312 retrieves the value of the modified data member of encapsulation 62 and returns that value.

Lock-State 314 returns either the current value of the concurrent lock data member of encapsulation 62 or "Invalid" if the data member indicates that the current lock is not valid.

Upgrade-Lock 316 attempts to upgrade an existing lock on object 64 to the requested lock. If the supplied lock is not a valid lock type, an error is returned. If the supplied lock is a READ-ONLY lock, the concurrent lock data member of encapsulation 62 is set to that value. If the current lock is valid and stronger than or equal to the supplied lock, control is returned to the caller of this function. If neither of these conditions apply, Set-Lock 524 is called requesting the supplied lock. If the lock was set, the concurrent lock data member of encapsulation 62 is set to the supplied lock and control is returned to the caller of this function.

In-Memory 318 checks the value of the object pointer data member of encapsulation 62 and returns a 1 (one) if the value indicates associated object 64 is in primary memory or 0 (zero) otherwise.

Make-Absent 320 updates encapsulation 62 such that subsequent references to object 64 using PTR 44 will cause OMS 42 to retrieve object 64 from POS Server 54. First, if the deleteable data member of encapsulation 62 indicates that OMS 42 allocated object 64, the deleteable data member of encapsulation 62 is set to indicate that OMS 42 did not allocate object 64 and the modified data members is set to "Not Modified". Next, object 64 and any dependent persistent objects it references are deleted. Regardless whether OMS 42 allocated object 64, the object pointer data member of encapsulation 62 is set to null to indicate that object 64 is not resident in primary memory, and control is returned to the caller of this function.

Make-Present 322 makes object 64 accessible through PTR 44. First, the object pointer data member of encapsulation 62 is checked to see if object 64 is already in primary memory. If so, control is returned to the caller of this function. Otherwise, Fetch 124 is called to retrieve object 64 object from POS Server 54 and install it in primary memory. If that is successful, the primary memory address of object 64 is returned.

Timecontext 324 retrieves and returns the value of the time context data member of object ID 78 of encapsulation 62. This value indicates the time context used when retrieving the object from the database.

Timestamp 326 retrieves and returns the value of the time stamp data member of encapsulation 62. This value indicates the time object 64 was saved to the database.

OMS 42 provides an additional capability to allow an application program to have independent persistent objects implicitly and automatically retrieved from POS Server 54 without having to call Fetch 120-124 or Make-Present 322. This capability is called object faulting and PTR 44 processes an occurrence of an object fault as follows. When an application program dereferences an instance of PTR 44, code is executed to check the value of the object pointer data member of associated encapsulation 62. If the value indicates that associated object 64 is already in primary memory, the application program continues. If the value indicates that associated object 64 is not in primary memory, Fetch 124 is called using object ID 78 data member in encapsulation 62. After object 64 has been installed in primary memory by Fetch 124, the application program continues. In the C++ embodiment, the code necessary to perform this processing is automatically generated by DDL 80 (included in the C++ files of source files 38). Specifically, a definition is provided to overload the C++ dereference operators ("a func()" and "(*a).-func()") for independent persistent object classes.

Figure 7B:
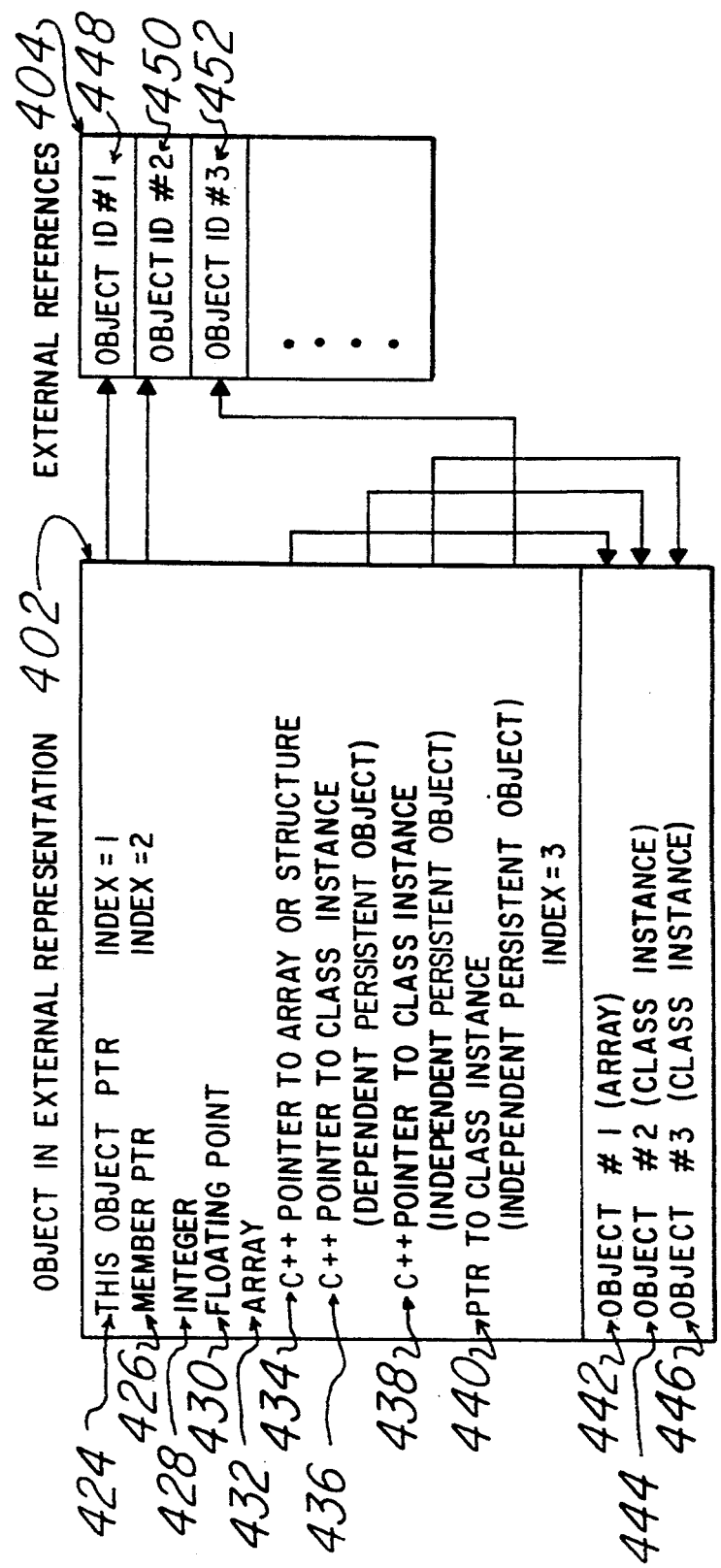

FIG. 7a shows primary memory representation 400 (hereinafter referred to as "object 400") of a C++ object. Although a C++ object can contain various data members, the present invention supports the following three categories of data types for the data members. The first category comprises those data types which can be fully embedded in the object (data members 410-414). The second category comprises those data types which are a reference to an independent or dependent persistent object using a C++ pointer (data members 416-420). The third category comprises those data types which are a reference to an independent persistent object using a PTR 44 (data members 406,408, and 422). FIG. 7b shows the secondary memory representation of a C++ object, which is composed of two items, external representation 402 and external references 404.

OTS 52 provides two interface functions to OMS 42 to translate persistent objects between their primary and secondary memory representations.

Internal2External is the first function and translates an object from its primary (or internal) to its secondary (or external) memory representation. It accomplishes the translation by first allocating two memory buffers to hold external representation 402 and external references 404. Next, information about the object (size, type ID) and each reference in the object (type of pointer, type of referenced object, how to determine the number of objects referenced, etc.) is obtained from types 40, as generated by DDL 80. Second, the data in object 400 is copied to external representation 402, starting at the beginning of external representation 402.

Then, for every reference, the following actions are performed. If the reference is a C++ pointer and it is not a null value, information on the referenced object is obtained from types 40. The referenced object is copied to external representation 402 after any other copied data and the offset of the copied referenced object (relative to the beginning of external representation 402) is stored at the location in external representation 402 of the original C++ pointer. For example, data member 418 references another object. After copying, data member 436 contains the offset from the beginning of external representation 402 of the copy of that object, namely, object 444. If the data type of the referenced object is a C++ structure or class, a similar translation process is performed on the referenced object. If the C++ pointer is a "boundary" pointer, the value in external representation 402 is set to 0 (zero). For example, if data member 416 were a boundary pointer, data member 434 would contain a 0 (zero). If the reference is a PTR 44, object ID 78 of the referenced object is obtained from associated encapsulation 62 and copied to external references 404 after any other copied object IDs 78, and the offset of that copy (relative to the beginning of external references 404) is stored in the appropriate location in external representation 402. For example, data member 422 is a PTR 44. Object ID 78 of the referenced object is stored in external reference 452; the location of external reference 452 (in external references 404) is stored in data member 440. Essentially, referenced objects or object IDs 78 are copied to a location and that location is stored where the original reference was copied. Finally, POS encapsulation 70 is updated (with this object's object ID 78, the architecture ID from the current instance of OMS 42, the type description ID associated with this object, and newly-created external representation 402 and external references 404) and returned to the caller of this function.

External2Internal is the second function and translates an object from its secondary (or external) to its primary (or internal) memory representation. It accomplishes the translation by first checking the architecture ID in supplied POS encapsulation 70 to see that it matches the architecture ID data member in the current instance of OMS 42. In the current embodiment, if they do not match, the object cannot be translated and an error is returned to the caller of this function. Second, information about the object is obtained as is done in Internal2External above. Third, sufficient primary memory to hold the object is allocated and the object is copied from external representation 402 to the newly allocated memory (for example, object 400).

Next, the following actions are performed for every reference. If the reference is a C++ pointer, information on the referenced object is obtained from types 40. Sufficient primary memory is allocated to hold the referenced object and the referenced object is copied from the location in external representation 402 as indicated by the value of the original reference. The corresponding reference in object 400 is updated to reference the newly allocated referenced object. For example, data member 436 is a C++ pointer whose referenced object is stored at object 444. After memory is allocated to hold the referenced object, the referenced object is copied from object 444 to the newly-allocated memory and data member 418 is updated to reference the newly allocated referenced object. If the data type of the referenced object is a C++ structure or class, a similar translation process is performed on the referenced object. If the reference is PTR 44, the following actions are performed. If object ID 78 of the referenced object is not null, the timestamp in object ID 78 is set to the timestamp of this object's encapsulation 62. This insures that the referencing object's timestamp will be used when the referenced object is retrieved from POS Server 54. Next, a reference to encapsulation 62 for the referenced object is obtained from object map 50 (one will be created if the object is not currently known to OMS 42). If application 14 does not currently hold a valid lock on the referenced object (determined by examining encapsulation 62 just obtained), the value of the concurrent lock data member of referenced object's encapsulation 62 is set to the value of the concurrent lock data member of this object's encapsulation 62. This insures that the referencing object's lock will be used when the referenced object is retrieved from POS Server 54. If application 14 holds a valid lock on the referenced object, Upgrade-Lock 316 Lock is called requesting a lock equal to the value of the concurrent lock data member in this object's encapsulation 62. Lastly, once all the references in the object have been processed, control is returned to the caller of this function.

POS Server 54 is used by OMS 42 to store and retrieve persistent objects in the database. In the C++ embodiment, the present invention uses a commercially available RDBMS 20 to store external representation 402 and external references 404 of an independent persistent object described above. The present invention interacts with RDBMS 20 using the embedded Standard Query Language (SQL) interface provided by the vendor. This allows the present invention to replace one vendor's RDBMS with another vendor's RDBMS with insignificant modifications to the present invention.

In order to store the persistent objects created by application 14 and managed by OMS 42, the following relational tables are defined in RDBMS 20.

The first table is the groups table which contains two attributes, storage group and object number. The purpose of the table is to control the allocation of object identifiers (object IDs 78) within storage groups. See the description of Alloc-Symbolic-Name below for details on how the object numbers are allocated.

The second table is the value table with the attributes shown below in Table 8. The purpose of this table is to hold sufficient information about an independent persistent object in order to identify it by its object ID 78 (composed of the first three attributes), identify the architecture of the computer hardware in which application 14 and OODB were executing when the object was saved, identify the object's type (class) description, identify the number of independent persistent objects it references, recreate the object, and install it in primary memory. If external representation 402 of the object is longer than the length allowed for attribute values by RDBMS 20, there are multiple tuples in this table for the single large object, with all values the same except for the "sequence number" (which begins with one and is incremented by one for every additional tuple) and the "external representation" (which continues where the previous tuple left off).

TABLE 8

Attributes in Groups Table

Storage Group;
Object Number;
Commit time;
Sequence number;
Object size;
Architecture Object Storage Group;
Architecture Object Number;
Architecture Object Commit time;
Type Descriptor Storage group;
Type Descriptor Object Number;
Type Descriptor Commit time;
Number of user defined attributes associated with the object;
Number of system defined attributes associated with the object;
Number of references to other persistent objects, including this object; and
External representation of object.

The last table is refto table with the attributes shown below in Table 9. The purpose of this table is to hole the references from one independent persistent object to other independent persistent objects. Each tuple set (one or more tuples with the same object ID) in the value table is associated with one or more tuples in this table by virtue of the storage group, object number, and commit time being the same as the associated value table tuple. If there are multiple references from an object, there are multiple tuples in this table with the values for the storage group, object number, and commit time attributes in the associated value tuple set, except for the "sequence number" (which begins with one and is incremented by one for every additional tuple). The number of tuples in this table associated with a tuple set in the value table equals the value of the "number of references" attribute in the associated value table tuple set.

TABLE 9

Attributes in Refto Table

Storage Group;
Object Number;
Commit time;
Sequence number;
Referenced Object Storage Group;
Referenced Object Object Number; and
Referenced Object Commit time.

Tables 10 and 11 show an example of how the object seen in FIGS. 7a and 7b might appear stored in the value and refto tables, respectively.

TABLE 10

| | | VALUE Table Tuples | | | | |
|---|---|---|---|---|---|---|
| Storage Group | Object Number | Commit Time | Sequence Number | Object Size | Other Attributes | External Representation |
| 5 | 1438 | 654318 | 1 | 83468 | — | [array of bytes] |
| 5 | 1438 | 654318 | 2 | 83468 | — | [array of bytes] |
| 5 | 1438 | 654318 | 3 | 83468 | — | [array of bytes] |

TABLE 11

REFTO Table Tuples

| Storage Group | Object Number | Commit Time | Sequence Number | Referenced Storage Group | Referenced Object Name | Referenced Commit Time |
|---|---|---|---|---|---|---|
| 5 | 1438 | 654318 | 1 | 5 | 1438 | 654318 |
| 5 | 1438 | 654318 | 2 | 8 | 3481 | 654318 |
| 5 | 1438 | 654318 | 3 | 12 | 3347 | 654318 |

OTS 52 and POS Server 54 pass between each other encapsulations 62 and POS encapsulations 70. An instance of POS encapsulation 70 contains the following data members.

Object ID is object ID 78 of the object being passed in this POS encapsulation 70.

Architecture ID is object ID 78 of a persistent object describing the architecture of the computer hardware in which application 14 and OODB 18 are currently executing.

Type description ID is object ID 78 of a persistent object that describes the primary memory representation of the object being passed in this POS encapsulation 70.

Size of object external representation is the number of bytes that object external representation 402 in this POS encapsulation 70 contains.

Object external representation is the external representation 402 of the object being passed in this POS encapsulation 70 contains.

Number of external references is the number of external references of the object being passed in this POS encapsulation 70.

External references is the external references 404 of the object being passed in this POS encapsulation 70 contains.

A instance of POS Server 54 contains the following data members.

Commit in progress records whether a commit operation is currently in progress. A commit starts when Begin-Commit 508 is called and ends when End-Commit 510 is called.

Transaction is a reference to a transaction machine (not shown) which monitors transactions being performed by multiple programs as they access the database.

Table 12 lists interface functions 500-524 together their function names and arguments, which POS Server 54 provides to OMS 42. A description of each function is given below. These functions either update the private state or return some information about the private state of an instance of POS Server 54. Interface functions 500-502, 506-510, and 514-524 update the private state of the instance, while interface function 504 and 512 returns information about the private state of the instance to OMS 42.

TABLE 12

POS Server Interface Functions

| | Name | Argument |
|---|---|---|
| 500 | Create | none |
| 502 | Delete | none |
| 504 | Is-Sg-Valid | Storage Group |
| 506 | Alloc-Symbolic-Name | Storage Group, Number Requested |
| 508 | Begin-Commit | none |
| 510 | End-Commit | none |
| 512 | Get-Object | Encapsulation |
| 514 | Put-Object | POS Encapsulation |
| 516 | Begin-Transaction | none |
| 518 | End-Transaction | none |
| 520 | Abort-Transaction | none |
| 522 | Set-Lock | Encapsulation, New Lock, Wait? |
| 524 | Set-Lock | Encapsulation, New Lock |

Create 500 creates an instance of POS Server 54 and connects to RDBMS 20 using the appropriate SQL statements (this allows further calls from POS Server 54 to RDBMS 20). Next an instance of the transaction machine is created and assigned to the transaction data member. Finally, control is returned to the caller of this function.

Delete 502 deletes an instance of a POS Server 54, calls Abort-Transaction 520 in case End-Commit 510 had not been called by OMS 42. Next, a disconnect from RDBMS 20 is performed using the appropriate SQL statements, making certain that any uncommitted changes previously made by OMS 42 are rolled back or deleted. In addition, this signals the end of calls from POS Server 54 to RDBMS 20. Finally, control is returned to the caller of this function.

Is-Sg-Valid 504 issues a SQL query to RDBMS 20 to determine if a tuple exists in the groups table with the supplied storage group. If a tuple exists, a 1 (one) is returned, otherwise a 0 (zero) is returned.

Alloc-Symbolic-Name 506 issues a SQL query to RDBMS 20 to retrieve the tuple in the groups table with the supplied storage group and makes a copy of the value of the object number attribute from the returned tuple. The object number attribute is incremented by the number requested and an SQL query is issued to update the modified tuple and commit the update in RDBMS 20. Finally, the copied value of the object number attribute is returned.

Begin-Commit 508 is used to record the beginning of a commit. If the value of the commit in progress data member indicates that a commit is in progress, an error is returned since only one commit can be in progress at any time. Otherwise, the current time from OS 16 is obtained, the value of the commit in progress data member is set to indicate that a commit is in progress, and the time obtained from OS 16 is returned.

End-Commit 510 is used to record the end of a commit. If the value of the commit in progress data member indicates that a commit is not in progress, an error is returned. Otherwise, an SQL query is issued to commit all pending changes previously sent to RDBMS 20 by POS Server 54. If that query fails, another SQL query is issued to rollback any pending changes to insure that none of the pending changes are seen by any other application 14 which may access this database. Finally, the value of the commit in progress data member is set to indicate that a commit is not in progress, and control is returned to the caller of this function.

Get-Object 512 begins by calling Is-Sg-Valid 504 to insure that the storage group in object ID 78 of supplied encapsulation 62 exists. If it does not exist, an error is returned. Otherwise, an SQL query is issued to RDBMS 20 to retrieve the first tuple in the value table which matches object ID 78 of supplied encapsulation 62. Next, using the value of the object size attribute in the retrieved tuple, a memory buffer sufficient to hold the entire object is allocated. If the object size attribute indicates that there are additional tuples with the same object ID (because the retrieved external representation 402 was too large to fit in one tuple), additional SQL queries are issued to retrieve the remaining value tuples. The portions of external representation 402 from the tuples retrieved are copied into the memory buffer. Next, an SQL query is issued to RDBMS 20 requesting the first tuple in the refto table which matches object ID 78 of supplied encapsulation 62. If the "number of references" attribute in the value tuple indicates that there are additional tuples with the same object ID, additional SQL queries are issued to retrieve the remaining refto tuples. The values of the referenced object storage group, object number, and commit time from these tuples are used to create an external references 404. Next, an SQL query is issued to RDBMS 20 to commit any pending work to insure that any RDBMs locks on any of the tuples retrieved are not further retained. Next, a POS encapsulation 70 is created and updated with a copy of object ID 78 from supplied encapsulation 62, the architecture ID, type description ID, size of external representation 402 and external representation 402 collected from the value tuple(s), and the number of external references and external references 404 collected from the refto tuple(s). Finally, this newly-created POS encapsulation 70 is returned to the caller of this function.

Put-Object 514 begins by checking the value of the commit in progress data member to insure that a commit is in progress. If one is not in progress, an error is returned. Otherwise, the length of external representation 402 in supplied POS encapsulation 70 is used to calculate how many value tuples will be needed to store external representation 402. An SQL query is issued to insert sufficient value tuples to store external representation 402, using object ID 78, architecture ID and type description ID data members in supplied POS encapsulation 70 for the other attribute values in the new value tuples (see Table 10). Next, the number of external references data member in supplied POS encapsulation 70 is used to determine how many refto tuples will be needed to store external references 404. An SQL query is issued to insert sufficient refto tuples to store external references 404, using object ID 78 in supplied POS encapsulation 70 for the other attribute values in the new refto tuples (see Table 11). Finally, control is returned to the caller of this function.

Begin-Transaction 516 is used to mark the beginning of a transaction started by application 14. If the transaction data member indicates that a transaction is already in progress, an error is returned. Otherwise, a new transaction ID is obtained from the transaction machine, and control is returned to the caller of this function.

End-Transaction 518 is used to mark the end of a transaction started by application 14. If the transaction data member indicates that a transaction is not currently in progress, an error is returned. Otherwise, the transaction machine is called to end the current transaction and control is returned to the caller of this function.

Abort-Transaction 520 is also used to mark the end of a transaction started by application 14. If the transaction data member indicates that a transaction is not currently in progress, an error is returned. Otherwise, the transaction machine is called to end the current transaction and control is returned to the caller of this function.

Set-Lock 522–524 has two forms which attempt to set a lock on the object associated with supplied encapsulation 62. The first form will wait until the lock has been granted while the second will return if the lock cannot be granted on the first attempt. If object ID 78 of supplied encapsulation 62 is a null object ID, control is returned to the caller of this function since the object does not yet exist in the the database and is implicitly WRITE locked by application 14. If the request is for a READ-ONLY lock, the concurrent lock data member in supplied encapsulation 62 is set to that value and control is returned to the caller of this function. If the request is for a READ or a WRITE Lock, the transaction machine is called to obtain the lock. If the lock could not be granted due to an error, an error is returned. If the lock were granted, the concurrent lock data member in the supplied encapsulation 62 is set to that value and control is returned to the caller of this function.

Application 14 interface with OMS 20 and PTR 44 by embedding function calls to OMS 20 and PTR 44 as well as use instances of PTR 44 in programming language statements in the application software. In the preferred embodiment of the present invention, OMS 42 consists of one library of software and one C++ header file corresponding to OMS 42. The application developer includes the OMS 42 header file along with source files 38 generated by DDL 80 into the application software during compilation. Types 40 is also compiled by the application developer. The library and object files produced during the compilation of the C++ source files are then linked to form an application load module. In the preferred embodiment of the present invention, OODB 18 and application 14 using OODB 18 execute in the same address space, while RDBMS 20 executes in a different address space.

If the function calls to OODB 18 are extracted from application 14 software, the resulting set of instructions would have the following basic control flow.

First, an instance of OMS 42 would be created to begin the interface with OMS 42.

Second, one or more instances of PTR 44 would be created to allow application to create and manipulate as well as store and/or retrieve persistent objects using the present invention.

Third, application 14 would call OMS Begin-Transaction 110.

Fourth, OMS Default-Storage-Group 108 would be called to define a new default storage group, if so desired by application 14, in which newly-created objects would be stored.

Fifth, OMS Default-Name-Context 118 would be called to define a new default name context, if so desired by application 14, in which new object names would be registered.

Sixth, application 14 would create instances of objects and manipulate them using functions defined for the instances' classes, including assigning references from one object to one or more other objects.

Seventh, for those objects to be saved to the database, application 14 would assign the objects to the appropriate PTR 44 instances and call PTR Set-Modified 310 and PTR Persist 304 on those PTRs 44.

Eighth, for those objects to be explicitly retrieved after they have been saved to the database, application 14 would call PTR Name 306 to associate an object name with each object.

Ninth, application 14 would call OMS Commit-Transaction 112 to end the transaction and save the objects to the database.

Tenth, application 14 would either call OMS Shutdown 106 or delete the instance of OMS 42 to terminate the interface with OMS 42.

Eleventh, if application 14 had called OMS Shutdown 106, it would call OMS Startup 102 to restart the interface with OMS 42. If application 14 had deleted its instance of OMS 42, it would create a new instance of OMS 42 to restart the interface with OMS 42.

Twelfth, application 14 would call OMS Begin-Transaction 110 to begin a new transaction.

Thirteenth, OMS Default-Storage-Group 108 would be called to define a new default storage group, if so desired by application 14, in which newly-created objects would be stored.

Fourteenth, OMS Default-Name-Context 118 would be called to define a new default name context, if so desired by application 14, in which new object names would be registered.

Fifteenth, application 14 would call OMS Fetch 120-124 to explicitly retrieve one or more persistent objects from the database.

Sixteenth, application 14 could then manipulate the retrieved objects using functions defined for the instances' classes, including assigning references from one object to one or more other objects. Manipulation of these objects would automatically retrieve other persistent objects as they are accessed by application 14. New objects could also be created by application 14.

Seventeenth, for those objects to be saved to the database, application 14 would call PTR Set-Modified 310 on the appropriate PTRs 44. Application 14 would also need to call PTR Persist 304 on the newly-created objects.

Eighteenth, for those newly-created objects to be explicitly retrieved after they have been saved to the database, application 14 would call PTR Name 306 to associate an object name with each object.

Ninteenth, application 14 would call OMS Commit-Transaction 112 to save the modified objects and newly-created objects to the database. Alternatively, application 14 would call OMS Abort-Transaction 114 to discard the modified objects and newly-created objects.

Twentieth, application 14 would either call OMS Shutdown 106 or delete the instance of OMS 42 to terminate the interface with OMS 42.

While a specific embodiment of the invention has been shown and described, various modifications and alternate embodiments will occur to those skilled in the art. Accordingly, it is intended that the invention be limited only in terms of the appended claims.

We claim:

1. A system for storing objects in a relational database for retrieval by an application program, comprising:
   an object manager which interfaces with said application program and performs a plurality of database operations;
   a persistent object storage server with a SQL interface to said relational database and an interface to said object manager, wherein said persistent object storage server stores said objects made persistent by said application program; and
   an object translator accessible by said object manager, wherein said object translator translates said objects between an object oriented representation and a relational database representation.

2. The system of claim 1, wherein said system further includes:
   a first buffer generated by said object translator, wherein said first buffer contains at least one object; and
   a second buffer generated by said object translator, wherein said second buffer contains at least one reference from said at least one object to additional at least one objects, and wherein said first buffer and said second buffer are interpretable by said at least relational database.

3. The system of claim 1, wherein said persistent object storage server stores said first buffer and said second buffer in said relational database and said persistent object storage server retrieves said first buffer and said second buffer from said relational database for return to said object manager.

4. The system of claim 3, wherein said object manager passes retrieved objects to said object translator for use by said application program during execution of said application program.

5. The system of claim 1, wherein said application program is written at least in part in an object-oriented programming language.

6. The system of claim 1, wherein said interface with said application program manages storage, in a computer's primary memory, of at least one object created by said application program or by said object manager, and said interface directs retrieval of said at least one object from said persistent object storage server upon request by and for use of said application program, and said interface also creates and maintains internal objects in said primary memory accessible only by said object manager.

7. The system of claim 6, wherein said object translator is adapted to receive said internal objects and said at least one object from said object manager, and
   wherein said object translator translates said at least one object from a database management representation to an external representation for said application program to create a translated at least one object,
   wherein said object translator translates from said external representation back to said database management representation; and
   wherein said object translator passes said translated at least one object back to said object manager.

8. The system of claim 7, wherein said persistent object storage server interfaces between said relational database and said object manager to store and retrieve said translated at least one object created by said application program or created by said object manager.

9. The system of claim 6, wherein said internal objects include an architecture identifier that defines the architecture of said internal object and at least one object type description that defines said internal object.

10. The system of claim 1, wherein said at least one relational database management system provides interfaces to store and retrieve said at least one object and wherein said at least one relational database management system also manages and retains said at least one object until explicitly removed from said at least one relational database system.

11. The system of claim 1, wherein said system further includes:
    a data definition language translator accessible by a user which processes at least one user-specified class definition and generates an equivalent at least one class definition and additional data structures for use by said object manager; and wherein said data definition language translator generates at least one object type description for use by said object translator as well as said object manager during execution of said at least one application program and generates class definitions for use by said user in building an application program.

12. The system of claim 1, wherein said interface with said application program and said at least one relational database management system includes:
an indicator and a retriever that allows said application program to dynamically specify retrieval of objects during execution of said application program;
wherein said indicator is set by said application program and specifies whether a referenced object should be retrieved from said at least one database when any referencing object is retrieved; and
wherein said retriever examines said indicator and determines whether said referenced objects are to be retrieved when their referencing object is retrieved, or whether to retrieve said referenced objects only when they are accessed through said referencing object.

13. A system for storing objects in a relational database for retrieval by an application program, comprising:
an object manager which interfaces with said application program and performs a plurality of database operations;
a persistent object storage server with a SQL interface to said relational database and an interface to said object manager, wherein said persistent object storage server stores said objects made persistent by said application program; and
an object translator accessible by said object manager, wherein said object translator translates said objects between primary and secondary memory representations in a computer architecture independent method;
a first buffer generated by said object translator, wherein said first buffer contains at least one object; and
a second buffer generated by said object translator, wherein said second buffer contains at least one reference from said at least one object to additional at least one objects, wherein said first buffer and said second buffer are interpretable by said at least one relational database; and
wherein said object manager passes retrieved objects to said object translator for use by said application program during execution of said application program;
wherein said persistent object storage server stores said first buffer and said second buffer into said relational database; and
wherein said persistent object storage server retrieves said first buffer and said second buffer from said relational database for return to said object manager.

14. The system of claim 13, wherein said application program is written at least in part in an object-oriented programming language.

15. The system of claim 13, wherein said interface with said application program manages storage, in a computer's primary memory, of at least one object created by said application program or by said object manager, and said interface directs retrieval of said at least one object from said persistent object storage server upon request by and for use of said application program, and said interface also creates and maintains internal objects in said primary memory accessible only by said object manager.

16. The system of claim 15, wherein said object translator is adapted to receive said internal objects and said at least one object from said object manager, and
wherein said object translator translates said at least one object from a database management representation to an external representation for said application program to create a translated at least one object,
wherein said object translator translates from said external representation back to said database management representation; and
wherein said object translator passes said translated at least one object back to said object manager.

17. The system of claim 16, wherein said persistent object storage server interfaces between at least one relational database management system and said object manager to store and retrieve said translated at least one object created by said application program or created by said object manager.

18. The system of claim 15, wherein said internal objects include an architecture identifier that defines the architecture of said internal object and at least one object type description that defines said internal object.

19. The system of claim 13, wherein said at least one relational database management system provides interfaces to store and retrieve said at least one object and wherein said at least one relational database management system also manages and retains said at least one object until explicitly removed from said at least one relational database system.

20. The system of claim 13, wherein said system further includes:
a data definition language translator accessible by a user which processes at least one user-specified class definition and generates an equivalent at least one class definition and additional data structures for use by said object manager; and
wherein said data definition language translator generates at least one object type description for use by said object translator as well as said object manager during execution of said at least one application program and generates class definitions for use by said user in building an application program.

21. The system of claim 13, wherein said interface with said application program and said at least one relational database management system includes:
an indicator and a retriever that allows said application program to dynamically specify retrieval of objects during execution of said application program;
wherein said indicator is set by said application program and specifies whether a referenced object should be retrieved from said at least one database when any referencing object is retrieved; and
wherein said retriever examines said indicator and determines whether said referenced objects are to be retrieved when their referencing object is retrieved, or whether to retrieve said referenced objects only when they are accessed through said referencing object.

* * * * *